US007007861B2

(12) United States Patent
Ketcha et al.

(10) Patent No.: US 7,007,861 B2
(45) Date of Patent: Mar. 7, 2006

(54) METHODS AND PERSONAL PROTECTION DEVICES FOR REPELLING INSECTS

(75) Inventors: Marcia Mary Ketcha, Cincinnati, OH (US); Pedro Antonio Rodriguez, Sanibel, FL (US); Todd Laurence Underiner, Cincinnati, OH (US); Lowen Robert Morrison, Cincinnati, OH (US); Dennis Allen Beckholt, Kettering, OH (US); Robert Stanley Dirksing, Cincinnati, OH (US); David Burton Moore, Hamilton, OH (US); Kendal William Kerr, Okeana, OH (US); James Douglas Still, Cincinnati, OH (US); Peter Blenkiron, Egham (GB); Fernando Benvegnu, Kobe (JP); John Patrick Herlinger, Germantown, OH (US); Charles Winston Saunders, Fairfield, OH (US); Andrew Wilson, Sandhurst (GB)

(73) Assignee: S.C. Johnson & Son, Inc., Racine, WI (US)

( * ) Notice: Subject to any disclaimer, the term of this patent is extended or adjusted under 35 U.S.C. 154(b) by 510 days.

(21) Appl. No.: 09/795,420

(22) Filed: Feb. 28, 2001

(65) Prior Publication Data

US 2002/0005437 A1  Jan. 17, 2002

Related U.S. Application Data

(60) Provisional application No. 60/210,247, filed on Jun. 8, 2000.

(51) Int. Cl.
*B05B 1/24* (2006.01)

(52) U.S. Cl. .......... 239/13; 239/128; 239/135; 239/136; 239/152; 239/289; 239/326; 239/418; 422/124; 422/125

(58) Field of Classification Search ............ 239/1, 239/3, 4, 13, 102.1, 102.2, 128, 135, 136, 239/152, 154, 289, 326, 418, 690; 43/1, 43/124, 125, 129, 132.1; 422/124, 125, 305, 422/307; 224/665, 666
See application file for complete search history.

(56) References Cited

U.S. PATENT DOCUMENTS

| 2,041,219 A | 5/1936 | Wade |
| 2,057,353 A | 10/1936 | Whittemore |

(Continued)

FOREIGN PATENT DOCUMENTS

| CA | 1 190 701 | 7/1985 |

(Continued)

OTHER PUBLICATIONS

Class, et al., "Pyrethroids as household insecticides: analysis, indoor exposure, and persistence," Fresenius' J. Anal. Chem. (1991) 340:446-453.

(Continued)

*Primary Examiner*—Steven J. Ganey

(57) ABSTRACT

Methods and devices for repelling insects are disclosed. The methods and devices provide personal protection from insect bites and insect landings, particularly mosquito bites. The methods and devices employ insect repellents such as pyrethroids at low (parts per billion) levels. The methods and devices effectively minimize the number of mosquitoes landing on a subject properly using the devices.

36 Claims, 10 Drawing Sheets

U.S. PATENT DOCUMENTS

| | | | |
|---|---|---|---|
| 2,140,516 | A | 12/1938 | Cowan |
| 2,724,921 | A * | 11/1955 | Hudon .................. 422/305 |
| 3,475,239 | A | 10/1969 | Fearon et al. |
| 3,523,645 | A * | 8/1970 | Beauchamp .............. 239/154 |
| 3,687,114 | A | 8/1972 | Berkstresser |
| 3,780,260 | A | 12/1973 | Elsner |
| 3,990,848 | A | 11/1976 | Corris |
| 4,035,451 | A | 7/1977 | Tringali |
| 4,037,352 | A | 7/1977 | Hennart et al. |
| 4,069,308 | A | 1/1978 | Tanaka |
| 4,171,340 | A | 10/1979 | Nishimura et al. |
| 4,174,702 | A | 11/1979 | Rappaport |
| 4,228,124 | A | 10/1980 | Kashihara et al. |
| 4,264,362 | A | 4/1981 | Sergev et al. |
| 4,271,092 | A | 6/1981 | Sullivan et al. |
| 4,277,024 | A | 7/1981 | Spector |
| 4,292,322 | A | 9/1981 | Muramoto et al. |
| 4,515,768 | A | 5/1985 | Hennart et al. |
| 4,735,358 | A * | 4/1988 | Morita et al. ............... 239/289 |
| 4,804,142 | A | 2/1989 | Riley |
| 4,839,144 | A | 6/1989 | Martin |
| 4,839,984 | A | 6/1989 | Saunders et al. |
| 4,874,787 | A | 10/1989 | Yamamoto et al. |
| 4,930,451 | A | 6/1990 | Miller et al. |
| 4,959,925 | A | 10/1990 | Nelson et al. |
| 5,003,635 | A | 4/1991 | Peterson |
| 5,007,196 | A | 4/1991 | Saunders et al. |
| RE33,864 | E | 3/1992 | Steiner et al. |
| 5,095,647 | A | 3/1992 | Zobele et al. |
| 5,147,582 | A | 9/1992 | Holzner, Sr. et al. |
| 5,168,654 | A | 12/1992 | Chien |
| 5,335,446 | A | 8/1994 | Shigetoyo |
| 5,370,829 | A | 12/1994 | Kunze |
| 5,443,056 | A | 8/1995 | Smith et al. |
| 5,455,043 | A | 10/1995 | Fischel-Ghodsian |
| 5,458,882 | A | 10/1995 | Marin et al. |
| 5,547,616 | A | 8/1996 | Dancs et al. |
| 5,569,484 | A | 10/1996 | Muller et al. |
| 5,644,866 | A * | 7/1997 | Katsuda et al. ............... 43/129 |
| 5,656,282 | A | 8/1997 | Cook et al. |
| 5,660,841 | A | 8/1997 | Kraft |
| 5,662,835 | A | 9/1997 | Collingwood |
| 5,688,509 | A | 11/1997 | Radwan et al. |
| 5,695,692 | A | 12/1997 | Kennedy |
| 5,700,430 | A | 12/1997 | Bonnema et al. |
| 5,711,955 | A | 1/1998 | Karg |
| 5,798,385 | A | 8/1998 | Marin |
| 5,807,539 | A | 9/1998 | Tsukii et al. |
| 5,862,960 | A | 1/1999 | Miller et al. |
| 5,891,811 | A | 4/1999 | Ashida et al. |
| 5,899,381 | A | 5/1999 | Gordon et al. |
| 5,918,590 | A | 7/1999 | Burkett et al. |
| 5,928,605 | A | 7/1999 | Bonnema et al. |
| 5,932,147 | A | 8/1999 | Chen |
| 6,033,212 | A | 3/2000 | Bonnema et al. |
| 6,050,551 | A * | 4/2000 | Anderson ............... 422/124 |
| 6,053,483 | A | 4/2000 | Chen |
| 6,143,313 | A | 11/2000 | Ito et al. |
| 6,293,044 | B1 * | 9/2001 | Feng ................ 43/132.1 |
| 6,361,752 | B1 | 3/2002 | Demarest et al. |
| 6,371,450 | B1 | 4/2002 | Davis et al. |
| 6,378,780 | B1 | 4/2002 | Martens, III et al. |
| 6,390,453 | B1 | 5/2002 | Frederickson et al. |
| 6,391,329 | B1 | 5/2002 | Ito et al. |
| 6,392,549 | B1 | 5/2002 | Wu |
| 6,446,384 | B1 | 9/2002 | Pedrotti et al. |
| 2001/0010758 | A1 | 8/2001 | Basaganas Millan |
| 2002/0000061 | A1 | 1/2002 | Pedrotti et al. |
| 2002/0005437 | A1 | 1/2002 | Ketcha et al. |
| 2002/0012680 | A1 | 1/2002 | Patel |
| 2002/0020185 | A1 | 2/2002 | Carr |
| 2002/0090317 | A1 | 7/2002 | Hardy et al. |
| 2002/0197189 | A1 | 12/2002 | Lua |
| 2003/0044326 | A1 | 3/2003 | Yamasaki et al. |

FOREIGN PATENT DOCUMENTS

| | | |
|---|---|---|
| CH | 657 052 | 8/1996 |
| CN | 1104841 A | 7/1995 |
| DE | 2 257 134 | 5/1973 |
| DE | 27 33 253 | 1/1978 |
| DE | 31 31 924 | 6/1982 |
| DE | 32 03 649 | 8/1982 |
| DE | 3703-986 C1 | 1/1988 |
| DE | 37 35 704 | 5/1989 |
| DE | G91 16 389.7 | 11/1992 |
| DE | 29620941 | 4/1997 |
| DE | 299 08 921 | 9/1999 |
| DE | 101 48 833 | 4/2002 |
| EP | 0 274 813 | 7/1988 |
| EP | 0 187 090 B1 | 4/1989 |
| EP | 0 397 301 | 11/1990 |
| EP | 0 431 742 | 6/1991 |
| EP | 0 314 761 | 6/1992 |
| EP | 0 470 088 | 6/1994 |
| EP | 0 672 425 | 9/1995 |
| EP | 0 717 100 A2 | 6/1996 |
| EP | 0 775 441 | 5/1997 |
| EP | 0 800 832 | 10/1997 |
| EP | 0 807 442 | 11/1997 |
| EP | 0 792 771 | 6/1998 |
| EP | 0 885 563 A1 | 12/1998 |
| EP | 0 897 755 | 2/1999 |
| EP | 0 962 139 | 12/1999 |
| EP | 0 962 139 A1 | 12/1999 |
| EP | 0 813 360 | 1/2000 |
| EP | 0 979 605 A1 | 2/2000 |
| EP | 0 824 318 | 6/2001 |
| EP | 1 118 338 | 7/2001 |
| EP | 1 142 593 | 10/2001 |
| EP | 1 159 874 | 12/2001 |
| EP | 1 180 325 | 2/2002 |
| EP | 1 205 192 | 5/2002 |
| EP | 1 262 100 | 12/2002 |
| FR | 2 543 832 | 10/1984 |
| GB | 2 222 775 | 3/1990 |
| GB | 2 236 482 | 4/1991 |
| GB | 2 286 124 | 8/1995 |
| GB | 2 298 793 | 9/1996 |
| JP | U4-77784 | 4/1972 |
| JP | U47-37678 | 12/1972 |
| JP | U50-125382 | 10/1975 |
| JP | U52-49176 | 4/1977 |
| JP | A52-127870 | 10/1977 |
| JP | U54-142678 | 10/1979 |
| JP | 56-53603 A | 5/1981 |
| JP | 56-75411 A | 6/1981 |
| JP | 56-122305 A | 9/1981 |
| JP | U57-36883 | 2/1982 |
| JP | A60-098932 | 1/1983 |
| JP | U58-021280 | 2/1983 |
| JP | 57-158937 A | 3/1984 |
| JP | U61-066489 | 5/1986 |
| JP | 2683667 | 3/1989 |
| JP | 02-009330 A | 1/1990 |
| JP | 2002-265425 | 10/1990 |
| JP | 03-206836 A | 9/1991 |
| JP | 03-356723 | 3/1993 |
| JP | A5-153892 | 6/1993 |
| JP | 05-068459 B2 | 9/1993 |
| JP | 05-262602 A | 10/1993 |
| JP | U6-13483 | 2/1994 |
| JP | A06-165631 | 6/1994 |
| JP | 6-75179 | 10/1994 |

| | | |
|---|---|---|
| JP | U7-14879 | 3/1995 |
| JP | 05-342559 | 6/1995 |
| JP | A07-163646 | 6/1995 |
| JP | A7-236399 | 9/1995 |
| JP | 07-324003 A | 12/1995 |
| JP | 08023851 | 1/1996 |
| JP | 08023852 | 1/1996 |
| JP | A8-23851 | 1/1996 |
| JP | A08-047362 | 2/1996 |
| JP | A8-131044 | 5/1996 |
| JP | A8-154554 | 6/1996 |
| JP | A08-214754 | 8/1996 |
| JP | 07-41096 | 9/1996 |
| JP | A09-028263 | 2/1997 |
| JP | A09-028264 | 2/1997 |
| JP | 07-258210 | 3/1997 |
| JP | A09-074972 | 3/1997 |
| JP | 09-175906 A | 7/1997 |
| JP | 09-215466 | 8/1997 |
| JP | 10-113113 A | 5/1998 |
| JP | 10-143603 | 5/1998 |
| JP | 09-137920 | 11/1998 |
| JP | A10-309160 | 11/1998 |
| JP | A11-028040 | 2/1999 |
| JP | 09-239118 | 3/1999 |
| JP | A11-056195 | 3/1999 |
| JP | A11-056196 | 3/1999 |
| JP | A11-103748 | 4/1999 |
| JP | A11-103749 | 4/1999 |
| JP | 09-300684 | 5/1999 |
| JP | A11-127754 | 5/1999 |
| JP | A11-169051 | 6/1999 |
| JP | A11-221505 | 8/1999 |
| JP | 11-289953 A | 10/1999 |
| JP | A11-308955 | 11/1999 |
| JP | A11-322504 | 11/1999 |
| JP | 2000-023612 | 1/2000 |
| JP | 10-361413 | 7/2000 |
| JP | U3071760 | 9/2000 |
| JP | 2000-270750 | 10/2000 |
| JP | U3072711 | 11/2000 |
| JP | 2001-086918 | 4/2001 |
| JP | 2001-095458 | 4/2001 |
| JP | 2001-103898 | 4/2001 |
| JP | 2001-103899 | 4/2001 |
| JP | 2001-136890 | 5/2001 |
| JP | 2001-197856 | 7/2001 |
| JP | 2001-224297 | 8/2001 |
| JP | 2001-231425 | 8/2001 |
| JP | 2001-247406 | 9/2001 |
| JP | 2001-247416 | 9/2001 |
| JP | 2001-292679 | 10/2001 |
| JP | 2001-292680 | 10/2001 |
| JP | 2001-292681 | 10/2001 |
| JP | 2001-309742 | 11/2001 |
| JP | 2001-309743 | 11/2001 |
| JP | 2001-333681 | 12/2001 |
| JP | 2001-346493 | 12/2001 |
| JP | 2001-352890 | 12/2001 |
| JP | 2002-027890 | 1/2002 |
| JP | 2002-027891 | 1/2002 |
| JP | 2002-058413 | 2/2002 |
| JP | 2002-058414 | 2/2002 |
| JP | U3085542 | 5/2002 |
| JP | 2002-191279 | 7/2002 |
| JP | 2002-209500 | 7/2002 |
| JP | 2002-219165 | 8/2002 |
| JP | 2002-224208 | 8/2002 |
| JP | 2002-226305 | 8/2002 |
| JP | 2002-281880 | 10/2002 |
| JP | 2002-282347 | 10/2002 |
| JP | 2002-291392 | 10/2002 |
| JP | 2002-300838 | 10/2002 |
| JP | 2002-306046 | 10/2002 |
| JP | 2002-317572 | 10/2002 |
| JP | 2002-332077 | 11/2002 |
| JP | 2002-345385 | 12/2002 |
| JP | 2002-345386 | 12/2002 |
| JP | 2003-009746 | 1/2003 |
| WO | WO 9013359 A1 | 11/1990 |
| WO | WO 93/08429 | 4/1993 |
| WO | WO 9320693 A1 | 10/1993 |
| WO | WO 95/10352 | 4/1995 |
| WO | WO 9632843 A2 | 10/1996 |
| WO | WO 9633605 A1 | 10/1996 |
| WO | WO 96/36056 | 11/1996 |
| WO | WO 97/04817 | 2/1997 |
| WO | WO 97/49435 | 12/1997 |
| WO | WO 9748257 A1 | 12/1997 |
| WO | WO 9813345 A1 | 4/1998 |
| WO | WO 9823149 A1 | 4/1998 |
| WO | WO 9902032 A1 | 1/1999 |
| WO | WO 0005948 A1 | 2/2000 |
| WO | WO 01/02025 | 1/2001 |
| WO | WO 01/56620 | 8/2001 |
| WO | WO 01/56621 | 8/2001 |
| WO | WO 01/56622 | 8/2001 |
| WO | WO 01/56623 | 8/2001 |
| WO | WO 01/93674 | 12/2001 |
| WO | WO 02/32472 | 4/2002 |
| WO | WO 02/060246 | 8/2002 |

OTHER PUBLICATIONS

Miller, "School's Out, and So Are Ticks," PR Newswire, May 5, 1998.

* cited by examiner

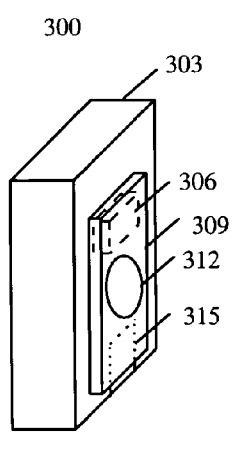
Figure 3A
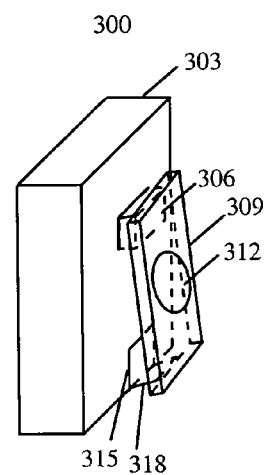
Figure 3B
Figure 3

METHODS AND PERSONAL PROTECTION DEVICES FOR REPELLING INSECTS

This application claims the benefit of Provisional Application No. 60/210,247, filed Jun. 8, 2000.

FIELD OF THE INVENTION

This invention relates to methods for repelling insects and devices therefor. More specifically, this invention relates to wearable personal protection devices and stationary devices that effectively prevent mosquitoes from reaching a subject or group of subjects using such a device.

BACKGROUND OF THE INVENTION

Harmful insects can carry agents that cause disease. For example, mosquitoes can carry viruses that cause encephalitis. Ticks can carry bacteria that cause Lyme disease. Furthermore, insect bites, such as mosquito or flea bites, can be an annoyance. Therefore, it is an object of this invention to provide a device that prevents insects from landing on a user of the device, thereby defending the user from suffering insect bites and insect landings. It is a further object of this invention to provide personal protection devices that repel insects, particularly mosquitoes.

Topical Repellents

One method by which consumers protect themselves from insect bites and insect landings is the use of topical repellents. Essentially all topical repellents contain N,N-diethyl-m-toluamide ("DEET") as the active ingredient. Such products include OFF® available from S. C. Johnson & Son, Inc., of Racine, Wis., CUTTER® available from United Industries Corp. of St. Louis, Mo., and BEN'S® MAX available from Tender Co. of Littleton, N.H. Many brands contain 14 to 95% DEET, although the products specifically advertised for children contain 10% DEET or less. These products are recommended for use on the skin and clothing.

Topical repellents contain relatively high amounts of insect repellent that can be absorbed into the bloodstream through the skin. Therefore, it is an object of this invention to provide a method for repelling insects using a lower level of insect repellent than that in the topical compositions. Topical repellents also suffer from the drawback that they only protect the skin to which they are applied. Therefore, if a user does not cover all skin and clothing with a sufficient amount of the topical repellent, the user may suffer insect bites and insect landings in the areas missed when the repellent was applied. It is a further object of this invention to provide a more convenient method for repelling insects than the use of topical repellents.

Spatial Protection Devices

Another method by which consumers protect themselves from insect bites and insect landings is by using devices for spatial protection, such as room protection devices and outdoor protection devices. The room protection devices are typically plug-in devices that employ electrical resistance heating to vaporize an insect repellent, such as allethrin, from a wick or a mat. Some devices additionally have a fan for dispersing the repellent. In the devices requiring heat to vaporize the repellent, the temperature typically required ranges from at least 50° C. to 100° C. or more.

For outside areas, burning repellent-containing candles and coils is popular. For example, citronella candles have been widely used. Mosquito coils such as OFF!® or Coleman® suffer from the drawbacks of causing smoke, difficulty in igniting, and difficulty in extinguishing. Furthermore, candles and coils are not easily portable once activated. A portable product is available from Schawbel Corporation of Boston, Mass. This portable product uses butane combustion as the heat source to vaporize allethrin.

In most of these spatial devices, protection does not start quickly after the device is activated. It can take 6 minutes, or more, for protection to begin. Therefore, it is a further object of this invention to provide a personal protection device that provides protection within 1 to 3 minutes after activation.

Although some of the spatial protection devices are portable, none of them are wearable. To vaporize the repellent, many such devices employ open flames, which render them unsuitable for wearing. Others require electricity to generate heat or power a fan motor, i.e., they are plug-in type devices that are not suitable to move far from an electrical outlet. Therefore, it is an object of this invention to provide a wearable personal protection device. Furthermore, existing spatial devices only protect users directly downwind of the device. Therefore, it is a further object of the invention to provide a wearable or portable personal protection device that effectively protects the subject wherever he or she goes.

Wearable Personal Protection Devices

Another method by which consumers attempt to protect themselves from insect bites and insect landings is by wearing personal protection devices. For example, many products that can be worn on a person rely on passive evaporation of the insect repellent out of a carrier impregnated therewith. Repellents in such devices include geraniol, citronella, and limonene. The devices can be in the form of, for example, a wrist band, a strip impregnated with an insect repellent that can be placed in cavities in clothing, a patch, or an adhesive tab. More effective repellents, including pyrethroids such as allethrin, are not sufficiently volatile for passive evaporation.

An alternative product is a clip-on device that emits the sound of dragonfly wings and bat vocalizations, operating under the theory that such predator sounds would be expected to repel mosquitoes.

However, these personal protection devices provide poor to nonexistent prevention of mosquito bites. Therefore, it is an object of this invention to provide a wearable personal protection device that effectively repels mosquitoes, i.e., prevents them from landing or minimizes the number of landings, on any part of a subject wearing the device.

SUMMARY OF THE INVENTION

This invention relates to methods and personal protection devices for repelling insects. The devices each comprise a composition comprising an insect repellent, preferably a pyrethroid such as allethrin. The devices actively disperse the insect repellent in an area (e.g., a scent-stream) around the subject, thereby preventing insects from reaching the subject. Without wishing to be bound by theory, it is thought that insects travel upwind to reach subjects by following scent cues in a 'scent-stream' from the subject. Therefore, it is believed that releasing a composition comprising an insect repellent into the scent-stream insects follow prevents insects from reaching the subject.

The methods and devices of this invention are advantageous over topical compositions for several reasons. First, they are more convenient in that they do not require the time consuming task of applying lotion or a spray to clothing and exposed skin. Furthermore, some consumers do not like the feel and smell of topical insect repellents, and the devices of this invention eliminate these problems. In addition, the methods and devices of this invention employ lower amounts of repellents than topical compositions. When allethrin is used as the repellent in the methods and devices of this invention, parts per billion levels dispersed in the atmosphere around a consumer effectively repel mosquitoes.

The personal protection devices of this invention are advantageous over known spatial protection devices because they are faster acting. For example, the personal protection devices provide protection in about 1 to about 3 minutes, or less, while known spatial devices can take about 6 minutes or more to begin providing protection.

Wearable devices are a preferred embodiment of this invention. Wearable devices are advantageous in that they offer similar advantages to those of topical compositions without the drawbacks. When a device is wearable, it provides protection wherever the subject goes, as would a topical composition when applied correctly. However, a wearable device eliminates potential problems associated with topical compositions, e.g., if the subject fails to cover all exposed areas of skin and clothing with a topical composition, insects may still reach the subject. The wearable device also provides the advantage that a much lower level of repellent is needed than that in topical compositions.

Furthermore, the wearable devices of this invention are superior to known outdoor (spatial) devices because a subject must be downwind of an outdoor device to be protected. Without wishing to be bound by theory, it is believed that this is because insects travel upwind to locate a subject based on, for example, scent.

BRIEF DESCRIPTION OF THE DRAWINGS

FIG. 3A is a housing for a wearable personal protection device having attachment means in the closed position according to a preferred embodiment of the invention.

FIG. 3B is a housing for a wearable personal protection device having attachment means in the open position according to a preferred embodiment of the invention.

DETAILED DESCRIPTION OF THE INVENTION

Figure 1:
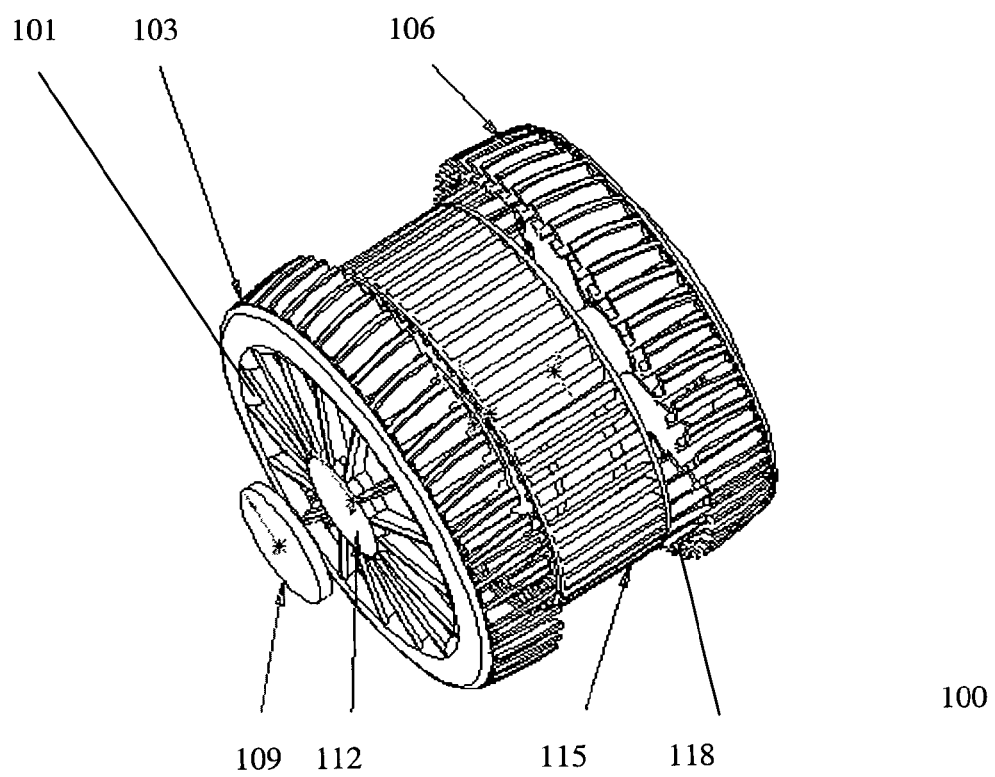
FIG. 1 is a fan with a cartridge for use in a personal protection device for repelling insects.

All United States patents cited herein are hereby incorporated by reference. All amounts are by weight, unless otherwise indicated.

Definitions

The following is a list of definitions for terms, as used herein for purposes of this application:

"Actively dispersing" means energy is being applied to an insect repellent to distribute it in a vapor 'cloud' in the atmosphere immediately surrounding a subject. Energy is generated in the devices of this invention. The energy can be in the form of heat, an air current, or both. Alternatively, the energy can be in the form of an electrical charge.

"Allethrin" means an insect repellent having the chemical name 2-methyl-4-oxo-3-(2-propenyl)-2-cyclopenten-1-yl 2,2-dimethyl-3-(2-methyl-1-propenyl)cyclopropanecarboxylate and its isomers. Allethrin includes d-allethrin, bioallethrin, s-bioallethrin, d-trans allethrin, and esdepallethrin.

"Effective amount" means a quantity of an insect repellent or composition containing an insect repellent high enough to prevent insects from landing on a subject, but low enough to avoid serious side effects (at a reasonable benefit/risk ratio). Surprisingly low levels of insect repellent afford protection.

"Empenthrin" means an insect repellent having the chemical name cyclopropanecarboxylic acid, 2,2-dimethyl-3-(2-methyl-1-propenyl)-1-ethynyl-2-methyl-2pentenyl ester and its isomers.

"Insect" means animals classified in Phylum Arthropoda and either Class Insecta or Class Arachnida. Insect includes flying insects such as mosquitoes, house flies, biting midges, gnats, black flies, sand flies, horse flies, and tsetse flies. Insect also includes crawling arachnids such as fleas, ticks, mites, chiggers, and spiders.

"Insect repellent" means any chemical that prevents or discourages insects from landing in the vicinity of the chemical or detrimentally affects them if they enter the vicinity.

"Movably dispersing" means that a composition comprising an insect repellent is distributed in a vapor into the air surrounding the subject such that a gradient of composition is maintained or is rapidly reestablished in the air even as the subject moves from one location to another.

"Passive evaporation" means the prior art process by which an insect repellent is released into the atmosphere from a carrier without applying energy (i.e., no heat or wind is applied).

"Personal protection device" means a device that repels insects from the immediate vicinity around one subject or around more than one subjects who are in close proximity to each other. Personal protection devices may be wearable or portable, or both.

"Prallethrin" means an insect repellent having the chemical name (S)-2-methyl-4-oxo-3-prop-2-ynylcyclopent-2-enyl-(1R)-cis-trans-2,2-dimethyl-3-(2-methylprop-1-enyl) cyclopropanecarboxylate and its isomers.

"Relative repellency factor" means the number of insects that land on a subject per unit of time when the subject is not using any insect repellent divided by the number of insects that land on a subject per unit of time when the subject is using an insect repellent device.

"Subject" means a living vertebrate animal such as a mammal (preferably human) in need of protection from insects.

"Sufficient repellency factor" means that the number of insects landing on a subject per unit of time decreases when the subject is using a device according to this invention (i.e., relative repellency factor increases). Sufficient relative repellency factor is greater than about 1, preferably about 2 or greater, more preferably about 4 or greater, most preferably about 15 or greater.

"Transfluthrin" means an insect repellent having the chemical name cyclopropanecarboxylic acid, 3-(2,2-dichloroethenyl)-2,2-dimethyl-(2,3,5,6-tetrafluorophenyl)methyl ester, (1R,3S)- and its isomers.

This invention relates to methods and devices for repelling insects. This invention can be used on various subjects including humans, pets such as cats and dogs, livestock such as cattle, pigs, horses, and sheep, and wild animals.

Insect Repellent Compositions

Various compositions for repelling insects can be used in this invention. The composition comprises (i) an insect repellent. Component (i) can be one insect repellent or a combination of two or more insect repellents. The composition optionally further comprise (ii) one or more optional ingredients. Optional ingredients include blowing agents, solvents, stabilizers, synergists, dyes, and perfumes.

Various insect repellents can be used for component (i). The exact choice of repellent depends on various factors, including the methods and devices in which it will be used, the attributes of the subject (e.g., age), and the type of insects to be repelled. However, suitable insect repellents are known in the art and are commercially available. Suitable repellents are exemplified by DEET, pyrethrins, chrysanthemic acid derivatives, and pyrethroids such as those in U.S. Pat. No. 4,515,768, which is hereby incorporated by reference for the purpose of disclosing suitable insect repellents. Examples of some suitable pyrethroids are shown in Table 1, below. Preferred pyrethroids for repelling mosquitoes include allethrin. Examples of pyrethroids are disclosed by Hennart et al., in U.S. Pat. No. 4,037,352 issued Jul. 26, 1977 and U.S. Pat. No. 4,515,768 issued May 7, 1985, which are hereby incorporated by reference for the purpose of disclosing pyrethroids. Allethrin is available from Sumitomo Chemical Company, Ltd. of Osaka, Japan under the trademark PYNAMIN FORTE®. Preferred pyrethroids do not have significant side effects such as toxicity or carcinogenicity to the subjects when used in an effective amount. Preferred pyrethroids do not contain cyano groups. Preferred pyrethroids include allethrin, empenthrin, and prallethrin. More preferred pyrethroids include allethrin and prallethrin.

TABLE 1

Examples of Pyrethroid Insect Repellents

| Common Name | Chemical Name | Alternate Names | Trademarks & Suppliers |
| --- | --- | --- | --- |
| ALLETHRIN | 2-Methyl-4-oxo-3-(2-propenyl)-2-cyclopenten-1-yl 2,2-dimethyl-3-(2-methyl-1-propenyl)cyclopropanecarboxylate | (RS)-3-Allyl-2-methyl-4-oxo-cyclopent-2-enyl (1RS)-cis-trans-chrysanthemate | PYNAMIN ® Sumitomo Chemical Co, Ltd. of Osaka Japan |
| d-ALLETHRIN | 2-Methyl-4-oxo-3-(2-propenyl)-2-cyclopenten-1-yl 2,2-dimethyl-3-(2-methyl-1-propenyl)cyclopropanecarboxylate | (RS)-3-Allyl-2-methyl-4-oxo-cyclopent-2-enyl (1R)-cis-trans-chrysanthemate | PYNAMIN-FORTE ® Sumitomo Chemical Co., Ltd. of Osaka Japan |
| BIOALLETHRIN | 2-Methyl-4-oxo-3-(2-propenyl)-2-cyclopenten-1-yl 2,2-dimethyl-3-(2-methyl-1-propenyl)cyclopropanecarboxylate | (RS)-3-Allyl-2-methyl-4-oxo-cyclopent-2-enyl (1R)-trans-chrysanthemate | ROUSSEL UCLAF of Paris, France |
| S-BIO-ALLETHRIN | 2-Methyl-4-oxo-3-(2-propenyl)-2-cyclopenten-1-yl 2,2-dimethyl-3-(2-methyl-1-propenyl)cyclopropanecarboxylate | (S)-3-Allyl-2-methyl-4-oxo-cyclopent-2-enyl (1R)-trans-chrysanthemate | ESBIOL ® ROUSSEL UCLAF of Paris, France |
| EMPENTHRIN | Cyclopropanecarboxylic acid, 2,2-dimethyl-3-(2-methyl-1-propenyl)-, 1-ethynyl-2-methyl-2-pentenyl ester | d-Empenthrin; Empenthrin; MA 108; S 2852; S 2852 Forte; S 2852F; Vaporthrin | Sumitomo Chemical Co., Ltd. of Osaka, Japan |
| PRALLETHRIN | (S)-2-methyl-4-oxo-3-prop-2-ynylcyclopent-2-enyl (1R)-cis-trans-2,2-dimethyl-3-(2-methylprop-1-enyl)cyclopropanecarboxylate | (S)-2-methyl-4-oxo-3-(-2-propynyl)cyclopenty-2-enyl (1R)cis, trans-chrysanthemate | ETOC ® Sumitomo Chemical Co., Ltd. of Osaka, Japan |
| TRANS-FLUTHRIN | Cyclopropanecarboxylic acid, 3-(2,2-dichloroethenyl)-2,2-dimethyl-(2,3,5,6-tetrafluorophenyl) methyl ester, (1R,3S)- | Cyclopropanecarboxylic acid, 3-(2,2-dichloroethenyl)-2,2-dimethyl-, (2,3,5,6-tetrafluorophenyl)-methyl ester, (1R-trans)-; 2,3,5,6-Tetrafluorobenzyl (+)-(1R-trans)-2,2-dimethyl-3-(2,2-dichlorovinyl) cyclopropanecarboxylate; and Benfluthrin | BAYO-THRIN ® Bayer Corporation of Germany |

Blowing agents include azodicarbonamide, dinitrosopentamethylenetetramine, azobisisobutyronitrile, and combinations thereof. Suitable blowing agents are disclosed in U.S. Pat. No. 4,228,124, which is hereby incorporated by reference for the purpose of disclosing blowing agents.

Solvents include alcohols such as cetyl alcohol, stearyl alcohol, and mixtures thereof.

Stabilizers (e.g., for providing stability to heat, light, and oxidation) include antioxidants such as 2,6-di-tert-butyl-4-methylphenol ("BHT"), 3-tert-butyl-4-hydroxyanisole ("BHA"), 2,2'-methylene-bis(4-ethyl-6-tert-butylphenol), 2,2'-methylene-bis-(4-methyl-6-tert-butylphenol), 4,4'-butylidene-bis(5-methyl-6-tert-butylphenol), 4,4'-methylene-bis(2-methyl-6-tert-butylphenol), 4,4'-thio-bis(3-methyl-6- tert-butylphenol), 4,4'-methylene-bis(2,6-di-tert-butylphenol), stearyl-β(3,5-di-tert-butyl-4-hydroxyphenol)-propionate, 1,3,5-trimethyl-2,4-6-tris(3,5-di-tert-butyl-4-hydroxybenzylbenzene), 1,1,3-tris(2-methyl-4-hydroxy-5-tert-butyl)-butane, tetrakis[methylene(3,5-di-tert-butyl-4-hydroxycinnimate)]methane, dilauryl thiodipropionate, distearyl thiodipropionate, UV absorbers derived from benzophenone, triazole, and salicylate compounds, and combinations thereof. Suitable stabilizers are disclosed in U.S. Pat. No. 4,874,787 at col. 4, lines 12–32. Other suitable stabilizers are disclosed in U.S. Pat. No. 4,515,768.

Synergists include α-[2-(2-butoxyethoxy)ethoxy]-4,5-methylenedioxy-2-propyltoluene, octachlorodipropyl ether, and N-(2-ethylhexyl)-bicyclo-[2,3,2]-hept-5-en-2,3-dicarboxyimide. Suitable synergists are disclosed in U.S. Pat. No. 4,874,787 at col. 3, lines 6–12, and U.S. Pat. No. 4,515,768.

Dyes in the composition can be used to show when the insect repellent is spent. For example, suitable dyes include 3-ethostearate of 9-ortho-carboxyphenyl-6-diethylamin-3-ethylamino-3-isoxanthene and electron-donating dyes. Dyes are disclosed in Japanese Patent Publication No's. 09-175906A and JP 07-324003A, International Patent Publication WO 96/33605 A1, and U.S. Pat. No. 5,891,811.

Perfumes can also be used in the composition. Perfumes can be used, e.g., to show when the insect repellent is spent or for aesthetic purposes. Perfumes must have similar volatility to the insect repellent and must not be attractive to insects. Examples of suitable perfumes include citronella, which can be used herein as a perfume, not an insect repellent.

The composition may be a solid or a liquid under ambient conditions.

Methods of the Invention

This invention relates to methods for repelling insects. The method comprises actively dispersing a composition described above, in an area immediately around a subject in an effective amount sufficient to prevent insects from reaching (e.g., landing on) the subject. Actively dispersing means that energy is being applied to the composition to disperse it into the air around a subject. Active dispersion should be distinguished from passive evaporation, wherein a volatile repellent is dispersed into the air around a subject, without external energy being applied.

Point Heating

In one embodiment of the invention, the composition is dispersed by point heating. Point heating is a process whereby a small amount of energy is used to rapidly heat a resistor such as a small filament or wire. A small amount of a composition (e.g., about 1 microgram to about 0.5 gram) is heated to near the normal atmospheric boiling point of the composition, e.g., over 200° C. for some compositions. Point heating offers the advantage of rapid and energy efficient dispersion and/or vaporization, in a convenient and portable fashion.

Point heating can be carried out by applying a current to a resistor in contact with a small amount (e.g., droplet) of the composition described above. Point heating may be pulsed or continuous. For example, a quantity of the composition could be very rapidly vaporized, followed by another quantity or alternatively the temperature can be controlled such the composition is slowly vaporized over an extended period of time. In pulsed point heating, the composition might be heated to about its normal boiling point (or slightly above). In continuous point heating, the composition may be heated to about 10 to about 40° C. below its normal boiling point.

Heating and Blowing

In one embodiment of this invention, the composition is dispersed by heating the composition to volatilize it and blowing the volatilized composition in an area around the subject. The composition is heated to a temperature sufficient to volatilize an effective amount of the composition when dispersed in the area around the subject. The volatilized composition can be blown by any convenient blowing means, such as a fan or turbine. When the composition is dispersed by heating and blowing, heating may be by point heating, as described above, or by bulk heating.

Bulk Heating

Bulk heating is carried out by heating a relatively large amount (e.g., about 1 to about 100 g) of the composition described above to a relatively low temperature. In bulk heating, the composition is heated to a temperature less than or equal to about 65° C. More preferably, the composition is heated to a temperature of about 30° C. to about 65° C., still more preferably about 35° C. to about 45° C., most preferably about 35° C. to about 40° C.

Other Dispersion Methods

In an alternative embodiment of the invention, the composition is atomized to disperse it in the area around the subject.

In an alternative embodiment of the invention, the composition is electrosprayed to disperse it in the area around the subject.

Movable Dispersion

In a preferred embodiment of this invention, the composition is movably dispersed in a manner such that protection continues wherever the subject moves. The composition can be movably dispersed when the subject wears a device that disperses the composition. In this embodiment, the composition can be heated, preferably to a temperature of less than or equal to about 65° C., more preferably less than or equal to about 45° C., still more preferably less than or equal to about 40° C., further more preferably less than or equal to about 35° C., and most preferably less than or equal to about 30° C.

The amount of composition needed depends on various factors including the specific insect repellent selected and the type of insects to be repelled. It has been found that parts per billion levels, or less, of allethrin in air dispersed around a subject effectively prevent mosquitoes from landing on the subject.

When the repellent is a pyrethroid, such as allethrin, it is dispersed in air in an amount of less than about 1 (i.e., a fraction greater than 0 but less than about 1), typically about 1, up to about 20 parts per billion, preferably less than 1, typically about 1, up to about 10 parts per billion, more preferably less than 1, typically about 1, up to about 3 parts per billion, and most preferably less than 1 to about 1 part per billion. However, some pyrethroids such as empenthrin and transfluthrin, which are more volatile than allethrin, may be dispersed in amounts higher than 20 parts per billion, e.g., up to 50 parts per billion.

Devices of the Invention

The methods described above can be carried out using personal protection devices to repel insects. Therefore, this invention further relates to personal protection devices comprising:
(1) a cartridge comprising
   (a) a composition comprising an insect repellent, and
(2) dispersion means for dispersing the insect repellent,
   wherein the cartridge is mounted to the device with respect to said dispersion means such that said dispersion means cause the insect repellent to be removed from the cartridge and to be dispersed in an area around a subject.

The devices of this invention can begin providing protection from insect bites and insect landings within about 3 minutes after activating the device. Preferably, the devices begin providing protection within about 1.5 minutes, more preferably within about 1 minute, after activating the device. The devices of this invention can provide a relative repellency factor of greater than about 1, preferably about 2 or greater, more preferably about 4 or greater, most preferably about 15 or greater.

In a preferred embodiment of this invention, the device further comprises (3) attachment means for attaching the device to a subject, wherein said attachment means are mounted to the device such that said attachment means do not interfere with said dispersion means. Said attachment means render the device wearable.

Cartridge

A cartridge suitable for use in the devices of this invention contains (a) the composition described above. In a preferred embodiment of this invention, the cartridge is removable, replaceable, and disposable, i.e., the cartridge is removable from the device and can be discarded when the insect repellent is spent, and a new cartridge can be installed in its place. In an alternative embodiment of the invention, the cartridge is not replaceable (i.e., it is not removable from the device without damaging the device). In an alternative embodiment of the invention, the entire device is disposable, for example, when the cartridge is not replaceable.

The cartridge may have a variety of forms. As long as the cartridge can be mounted to the device such that the composition is dispersed therefrom, the form of the cartridge is not critical. The cartridge can have, for example, a flat shape such as a pad or disc or a three-dimensional shape such as hollow shape e.g., a tube or honeycomb. In one embodiment of the invention, the cartridge can have the form of a hollow tube such as a capillary tube. Capillary tube cartridges are particularly well suited for use in devices employing point heating, electrospray, and atomization to disperse the composition. Capillary tubes typically have an outside diameter of about 1 millimeter and an inside diameter of about 0.1 to about 0.5 millimeters.

In an alternative embodiment of the invention, the cartridge optionally further comprises (b) a carrier. The carrier contains (a) the composition in the cartridge. Carriers are particularly well suited for use in devices employing bulk heating.

The carrier can be any material that does not detrimentally affect the performance of the insect repellent. For example, the carrier may comprise one or more components selected from the group consisting of adsorbents such as alumina, zeolites, and carbon cloth, absorbents such as paper (e.g., paper-board, corrugated paper, and coiled corrugated paper), cellulosic material (e.g., open pore cellulosic materials), woven cloth and nonwoven cloth of any suitable fibers (e.g., felt, glass), gels (e.g., silica gel), starches, ceramics, absorbent solid porous foams such as polyurethane foam, and finely divided, channeled, or honeycombed structures molded of nonporous materials such as plastics, waxes, and resins.

The cartridge can be formed from the composition and the carrier by any conventional means. For example, the composition can be impregnated in the carrier by a process comprising dissolving the repellent and any optional ingredients in an appropriate solvent, wetting the carrier with the resulting solution, and optionally evaporating the solvent under ambient conditions or with heat, with reduced pressure, or both. Alternatively, the composition, or a solvent solution thereof, may be coated or printed on the carrier, preferably when air is to pass over, not through, the cartridge. Suitable solvents are exemplified by alcohols such as methanol, ethanol stearyl alcohol, cetyl alcohol, and mixtures thereof, hydrocarbons such as pentane, and petroleum distillates, acetone, and ethers.

The amount of composition in the cartridge depends on various factors including the size of the cartridge, the rate of air movement past or through cartridge or device, the longevity of effectiveness desired, and the amount of composition required to effectively repel insects. In one embodiment of the invention, e.g., when bulk heating is employed, the composition is preferably present in an amount of less than about 1 (i.e., a fraction greater than 0 but less than about 1), typically about 1, up to about 100 g. In an alternative embodiment of the embodiment of the invention, the cartridge has the form of a hollow tube and the amount of the composition in the cartridge is about 1 microgram to about 10 milligrams.

Dispersion Means

The dispersion means actively disperses the insect repellent from the cartridge to an area around a subject using the device. In one embodiment of the invention, the dispersion means comprise heating means and blowing means. The heating means volatilize the composition and the blowing means aid in dispersing the volatilized composition in the area around the subject. In this embodiment, the heating means can be point heating means or bulk heating means. In an alternative embodiment of the invention, the dispersion means comprise point heating means.

Point Heating Means

Point heating means operate at high temperatures, up to thenormal boiling point of the compositions used in this invention, typically about 70 to about 225° C. Point heating means offer the advantage that only a small area (and a small amount of composition) is heated to a high temperature, thereby relatively low energy input is required to volatilize the composition. Point heating means comprise a micro heating source, including resistors, such as a small heating element or filament similar to those found in the smallest incandescent light bulbs (e.g., flashlight bulbs). The filament can be NICHROME® wire available from Pelican Wire Co., Inc. of Naples, Fla. (NICHROME® is an alloy comprising nickel and chromium). Point heating means preferably comprise an electrical power source such as a battery to power the small heating element or filament. In one embodiment of the invention, point heating is carried out by applying a current to a small amount (e.g., droplet) of the composition described above. The droplet may be supplied to the element or filament as it exits the cartridge, or alternatively, the element or filament can be part of the cartridge. In an alternative embodiment of the invention, the composition is a solid and the element or filament is contained therein as part of the cartridge.

Bulk Heating Means

Bulk heating means can also be used to volatilize the composition. The temperature to which the composition is heated depends on the vapor pressure of the composition selected and the efficacy of the composition (i.e., the amount of composition required to effectively repel insects). However, in a preferred embodiment of the invention, particularly wherein the device is wearable, the temperature does not exceed about 65° C., preferably about 45° C., more preferably about 40° C., still more preferably about 35° C., and most preferably about 30° C. to minimize burn hazard potential. The device may be insulated to protect the wearer from the heating means, particularly when the temperature is above about 45° C.

Various bulk heating means may be used to heat the cartridge, thereby volatilizing the insect repellent. For example, electric heat from a battery or other electrical power source may be used to heat the cartridge. In some environments, solar energy may be sufficient to volatilize the repellent, or solar energy in conjunction with a fresnel lens or solar cell. In an alternative embodiment of the invention, the heating means may be chemical or mechanical.

For example, chemical heating means include chemicals creating an exothermic reaction. Suitable chemicals for creating an exothermic reaction include chemicals comprising iron powder, carbon particles, and a metal salt such as alkali metal or alkaline earth salts, and water. Suitable chemicals are disclosed in U.S. Pat. Nos. 5,918,590; 4,264,362; and 3,475,239.

Other suitable chemical heating means include exothermic heater devices such as those disclosed in U.S. Pat. No. 5,443,056. Such devices are commercially available from Zestotherm, Inc. of Cincinnati, Ohio. These exothermic heater devices comprise a mixture of magnesium-iron alloy and salt confined within a nonwoven cellulose covering and forming an elongated cartridge which is wrapped with multiple layers of absorbent paper. The elongated cartridge and paper are enclosed within a pouch of perforated plastic film to form a heating element. One or more heating elements are attached by adhesive tape to the inside of a generally triangular polyethylene film envelope, and peripheral portions of the envelope are heat sealed to form an enclosed chamber. An overlying mating sheet of polyethylene coated nylon film and a pad of thermoplastic foam material are heat sealed to peripheral portions of the envelope, and parallel strips of double-sided adhesive tape, with removal protective strips, are attached to the outer surface of the envelope to form a flexible heater device. The device can be used by being wrapped around the cartridge of this invention. An upper sealed corner portion of the envelope is cut and removed to form an opening for the chamber, and water is poured through the opening into the chamber to initiate an exothermic reaction with each heating element.

In a preferred embodiment of the invention, the chemical heating means comprise THERMACARE® available from the Procter & Gamble Company of Cincinnati, Ohio. THERMACARE® is particularly useful in disposable devices.

The heating means are capable of maintaining the desired temperature over a reasonable usage period for the device. Combinations of electrical, solar, chemical, and mechanical power sources may be used for said heating means.

In a preferred embodiment of the invention, the device comprises bulk heating means for volatilizing the composition and blowing means for dispersing the volatilized composition. Preferably, the bulk heating means and blowing means are powered by separate power sources. In a particularly preferred embodiment, the bulk heating means are powered by a chemical power source and the blowing means are powered by an electrical power source.

Blowing Means

The blowing means can be any suitable means that create an air current sufficient to disperse the insect repellent in the area around the subject. In one embodiment of the invention, the blowing means are positioned in the device such that they direct the air current to impinge on the cartridge, for example, past one or more surfaces of the cartridge or through the cartridge, e.g., when the cartridge has a hollow shape such as a tubular or honeycomb shape. In an alternative embodiment of the invention, the blowing means are positioned in the device such that they direct an air current near, but not necessarily impinging on, the cartridge. The blowing means can be, for example, a fan. The fan can be mounted in a housing and driven by a motor. The fan can be one-, two-, or multi-directional. Suitable fans are known in the art and are commercially available. For example, 5 V DC fans are available from Cofan USA of Fremont, Calif. Other suitable fans are available from Mechatronics, Inc. of Preston, Wash., as the F 4010 senes.

In a preferred embodiment of the invention, the fan mimics the shape of the desired dispersion pattern. For example, in a preferred embodiment of the invention, the personal protection device is wearable. When the device is wearable, e.g., on a belt, a dispersion pattern having the shape of an elongated ellipse can be employed to disperse sufficient repellent upward (around the torso and head of a human subject) and downward (around the legs and feet of the human subject).

The blowing means can be powered by, for example, an electrical power source such as a battery, a solar power source such as a solar cell, a mechanical power source such as a wind-up generator, or combinations thereof.

In one embodiment of this invention, said dispersion means comprise blowing means and bulk heating means. In this embodiment, said blowing means communicate with the cartridge such that an air current produced by said blowing means causes egress of the composition from the cartridge. The air current carries the composition out of the device and into the immediate vicinity of a subject using the device. The blowing means can be mounted to the device such that an air current produced by said blowing means impinges on a surface of the cartridge.

In this embodiment of the invention, said bulk heating means are mounted to the device such that at least one surface of the cartridge is heated. Typically, a surface of the cartridge contacts said bulk heating means. The surface that contacts the bulk heating means and the surface on which the air current can impinge can be different, for example, when the bulk heating means comprise a plate such as a metal plate. Alternatively, the surface that contacts the bulk heating means and the surface on which the air current can impinge can be the same, for example, when the bulk heating means comprise a screen or mesh. Said bulk heating means are capable of heating the cartridge to a temperature of about 30° C. to about 65° C., preferably about 35° C. to about 45° C., most preferably about 40 ° C. to about 45° C. Said bulk heating means are capable of maintaining the temperature over a reasonable usage period for the device. For example, in this embodiment, the cartridge may have a first surface and a second surface; and said dispersion means comprise: (a) bulk heating means for heating the composition to a temperature of less than or equal to about 65° C., wherein said bulk heating means contact the first surface of the cartridge, and (b) blowing means for creating an air current, wherein said blowing means are mounted to the device such that the air current impinges on the second surface of the cartridge.

In a preferred embodiment of the invention, the dispersion means comprise blowing means and heating means, wherein the blowing means are positioned in the device such that the air current is directed near (not impinging on) the cartridge to conserve energy required to power the blowing means and heating means. For example, if an air current is directed to impinge on the cartridge such that the air current also impinges on the heating means, heat will be dissipated more quickly than if the air current did not impinge on the heating means. If the heating means are positioned near one surface (e.g., bottom) of the cartridge, and the air current is directed to pass above another surface (e.g., top) of the cartridge, the air current can disperse the repellent volatilizing out of the cartridge with minimal heat loss. This conserves power, which is particularly desirable when the power source for the blowing means, heating means, or both, is, for example, a battery with a limited life. In this embodiment, the heating means can be point heating means or bulk heating means.

In an alternative embodiment of the invention, the cartridge comprises a composition, a carrier, and a heater circuit, and the dispersion means comprise blowing means. Preferably, the dispersion means further comprise a power source for the heater circuit. (Alternatively, the cartridge may further comprise the power source for the heater circuit.) Typically, the heater circuit comprises an electrical circuit lithographically printed onto a substrate from an ink comprising electrically conductive particles suspended in a resin. Suitable heater circuits are disclosed in PCT Publication Number WO 97/48257.

Other Dispersion Means

In an alternative embodiment of the invention the dispersion means comprise an electrospray, which uses an electrical charge to disperse the repellent instead of blowing means and heating means. Alternatively, the dispersion means comprise an atomizer such as a piezoelctric atomizer available from Microflow Engineering of Sweden. An example of a piezoelectric atomizer operates on piezoelectric oscillation to produce insect repellent particles of about 5 micron diameter and deliver them about 5–6 inches. The piezoelectric atomizer runs on 2 AA batteries through several thousand cycles. The piezoelectric atomizer is about the size of a postage stamp (not including the batteries) and could be entirely disposable.

Attachment Means

In a preferred embodiment of the invention, the devices of this invention are wearable, i.e., attached directly or indirectly to a subject. Wearable devices comprise attachment means for attaching the device to the subject.

The attachment means comprise one or more elements including clips such as belt clips, pins, adhesives, hook and loop fasteners such as VELCRO® available from Velcro Industries B.V. of the Netherlands, magnets, ties, necklaces, straps, or bands such as wrist bands (watch bands) and ankle bands that can be elastic or nonelastic and can have, for example, buckles or other fasteners.

The wearable devices may be attached directly to the subject e.g., by a wrist or ankle band or to clothing or accessories worn by the subject (e.g., accessories such as a person's belt, backpack, or purse; a pet's collar or harness; and others). Alternatively, the devices may be attached indirectly to a subject by attaching the device to something near the subject, such as furniture on which the subject is sitting, a baby stroller which a subject is pushing or in which a subject is sitting, or a tool used by the subject, such as a garden tool (e.g., a hoe, shovel, or chain saw).

The attachment means described above are exemplary, not limiting. Other suitable attachment means may be used in addition to, or instead of, the attachment means described above. One skilled in the art would be able to select appropriate attachment means, and modes for attaching a device to a subject, without undue experimentation.

One embodiment of this invention is a wearable device for livestock and pets. In this embodiment, the insect repellent is preferably empenthrin, and the heating means are preferably solar (e.g., with a fresnel lens).

In a preferred embodiment of this invention, the device is lightweight and convenient. Light weights are particularly preferred for wearable devices. Preferably, the device weighs less than about 350 g. More preferably, the device weighs about 225 g or less. More preferably, the device weighs about 210 g or less. Still more preferably, the device weighs about 150 g or less. Most preferably, the device weighs about 100 g or less.

Optional Elements

The devices of this invention may further comprise one or more optional elements in addition to the elements described above. The optional elements include the following.

Element (i) is a switch connected to said dispersion means. The switch can be manual so that a subject can turn said dispersion means on to activate the device when desired and off to deactivate the device when protection from insect bites and insect landings is no longer required.

Element (ii) is a timer. The timer is connected to the dispersion means to automatically turn the dispersion means on and off at user-defined or preprogrammed intervals.

Element (iii) is a thermocouple or thermometer connected to said heating means or the cartridge for measuring the temperature to which the insect repellent is exposed.

Element (iv) is a temperature controller such as a thermostat that can be connected to element (iii). The temperature controller can be used to automatically turn the heating means on and off based on a temperature set point, which corresponds to that temperature sufficient to volatilize an effective amount of insect repellent.

Element (v) comprises an air intake, air outlet, and an optional shutter or other closure means. Shutters may be mounted in the air intake or air outlet, or both. The air intake and air outlet communicate with said dispersion means, or a component thereof (i.e., blowing means) to provide an air current that causes egress of the repellent from the device. Shutters are preferably installed in both the air intake and air outlet such that shutters may be closed to block both the air intake and air outlet, thereby preventing loss of the insect repellent, e.g., by diffusion out of the cartridge when the device is deactivated (e.g., the dispersion means are turned off). Shutters installed in both the air intake and air outlet may be opened when the device is activated to allow dispersion of the repellent. Shutters are preferably installed when a volatile insect repellent is used. Element (v) may comprise one or more air intakes, one or more air outlets, one or more shutters, and combinations thereof.

Element (vi) is a baffle. The baffle can be used to direct air flow towards the air outlet or outlets.

Element (vii) is a receptacle for receiving, positioning, and maintaining the cartridge in the device near the dispersion means. Element (vi) is preferably present when the device is reusable, i.e., the cartridge can be removed and replaced when the insect repellent is spent.

Element (viii) is a stand for propping the device on a surface. The stand may be integrated with the attachment means in wearable devices.

FIG. 1 represents a cartridge and fan assembly 100 for use in a personal protection device according to one embodiment of this invention. The assembly 100 has a cartridge 109 that is removably received by a receptacle 112. The receptacle is located in a housing 118 having an air intake 101 and an air outlet 103 and a housing back 106. The housing 118 surrounds the dispersion means, which comprise a fan 115.

Figure 2:
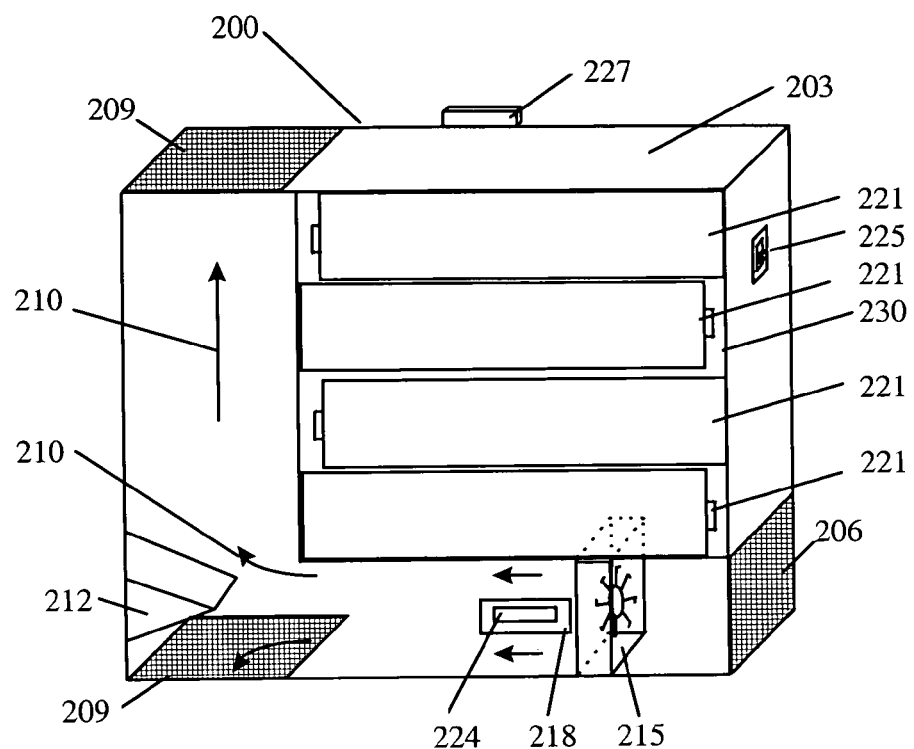
FIG. 2 is a wearable personal protection device for repelling insects.

FIG. 2 shows a wearable personal protection device 200. The device 200 has a cartridge, as described above, 224. The device 200 has dispersion means for dispersing the insect repellent, wherein said dispersion means comprise a heater 218 on which the cartridge 224 is mounted, a fan 215 mounted to the device 200 opposite the heater 218 such that the fan 215 produces air currents 210 and directs the air currents 210 past the cartridge 224, and a baffle 212 mounted to the device opposite the cartridge, such that the cartridge is between the fan 215 and baffle 212. The baffle 212 is located between the air intake 206 and air outlets 209, and the baffle 212 directs air currents 210 upward and downward (e.g., towards the torso and legs of a human subject wearing the device at waist level). The device 200 further comprises a housing 203 around the cartridge 224 and said dispersion means. The housing 203 comprises an air intake 206 upwind of the fan 215 and air outlets 209 downwind of the fan 215 and cartridge 224, a battery receptacle 230 mounted to the device 200 such that it does not impede the air currents 210 between the air intake 206 and air outlet 209, a switch 225 on a surface of the housing 203 for turning the fan 215 and heater 218 on and off, and attachment means 227 mounted to an outer surface of the housing 203 such that said attachment means 227 do not interfere with said dispersion means. The fan 215 and heater 218 are electrically powered by batteries 221 located in the battery receptacle 230.

FIG. 3 shows attachment means with a stand for wearable personal protection devices 300 having housings 303. FIG. 3A shows the attachment means in the closed position. FIG. 3B shows the attachment means in the open position.

FIG. 3A shows a wearable personal protection device 300. The device has a housing 303 with attachment means comprising a spring 306 pivotally connecting a clip 309 to the housing 303. The clip 309 has a magnet 312 included therein. The magnet 312 can be used to attach the device 300 to metal surfaces, such as metal portions of a baby stroller (not shown). The housing 303 has a groove 315 located behind the portion of the clip 309 opposite the spring 306 to hold the clip 309 in the open position.

FIG. 3B shows a wearable personal protection device 300. The device has a housing 303 with attachment means comprising a spring 306 pivotally connecting a clip 309 to the housing 303. The clip 309 has a magnet 312 included therein. A lever 318 is pivoted outward from groove 315. The lever 318 holds the clip 309 away from the housing 303.

In this embodiment of the invention, the attachment means can be used as a stand to prop up the device placed on a surface.

Figure 4:
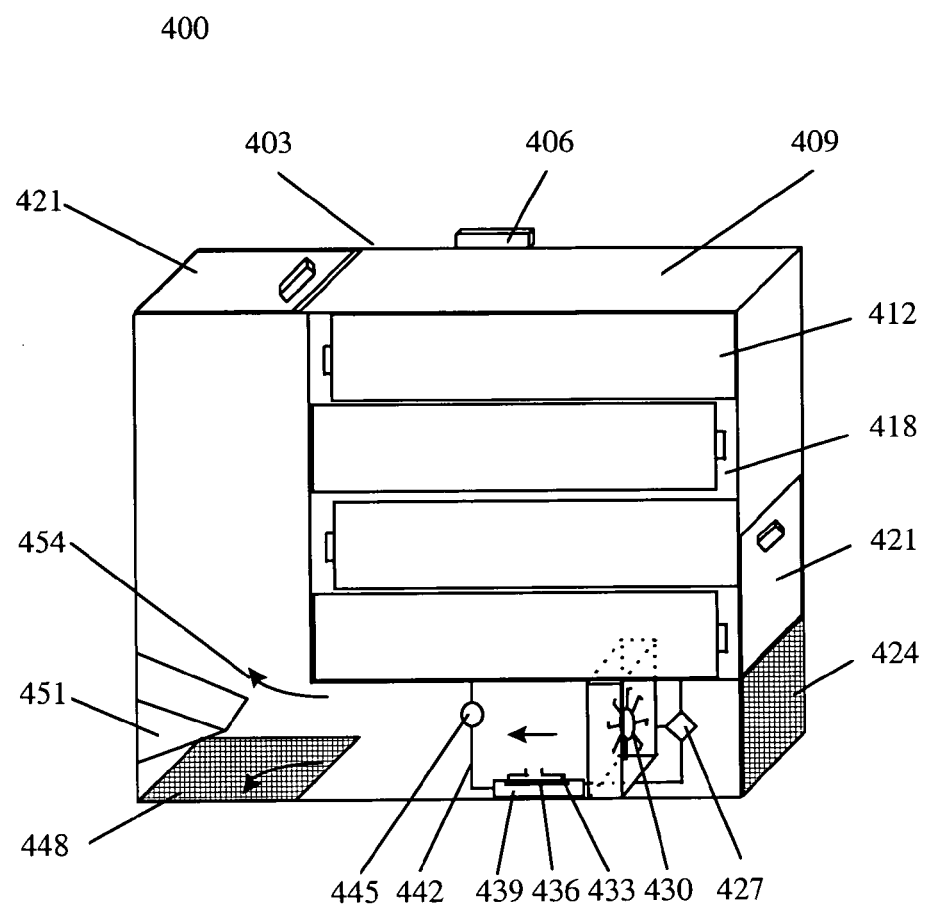
FIG. 4 is a wearable personal protection device for repelling insects.

FIG. 4 shows a wearable personal protection device 400 according to an alternative embodiment of this invention. The device comprises a cartridge 433 as described above. The cartridge is positioned in a receptacle 436 mounted on a heater 439. A fan 430 creates air currents 454 that blow over the top of the cartridge 433 to cause egress of the repellent from the cartridge 433. The fan 430 and heater 439 are powered by batteries 412 housed in a battery receptacle 418 which is mounted to the device such that it does not block air from entering air intake 424 and air currents 454 from exiting the device at air outlets 448. The fan 430 and heater 439 communicate with a timer 427 that controls when the fan 430 and heater 439 turn on and off. The temperature of the heater 439 is controlled by a thermocouple 442 and temperature controller 445, communicating with the heater 439. The device 400 further comprises a housing 409 around the above elements. The housing has air inlet 424 upwind of the fan 430 and air outlets 448 downwind of the fan 430 and cartridge 433. A baffle 451 located between the cartridge 433 and air outlets 448 directs the air currents 454 upward and downward (e.g., towards the torso and legs of a human subject wearing the device). The housing 409 has shutters 421 that can slide over the air intake 424 and air outlets 448. The housing 409 further comprises attachment means 406 mounted to an outer surface of the housing 403 such that said attachment means 406 do not interfere with the air currents 454.

Figure 5:
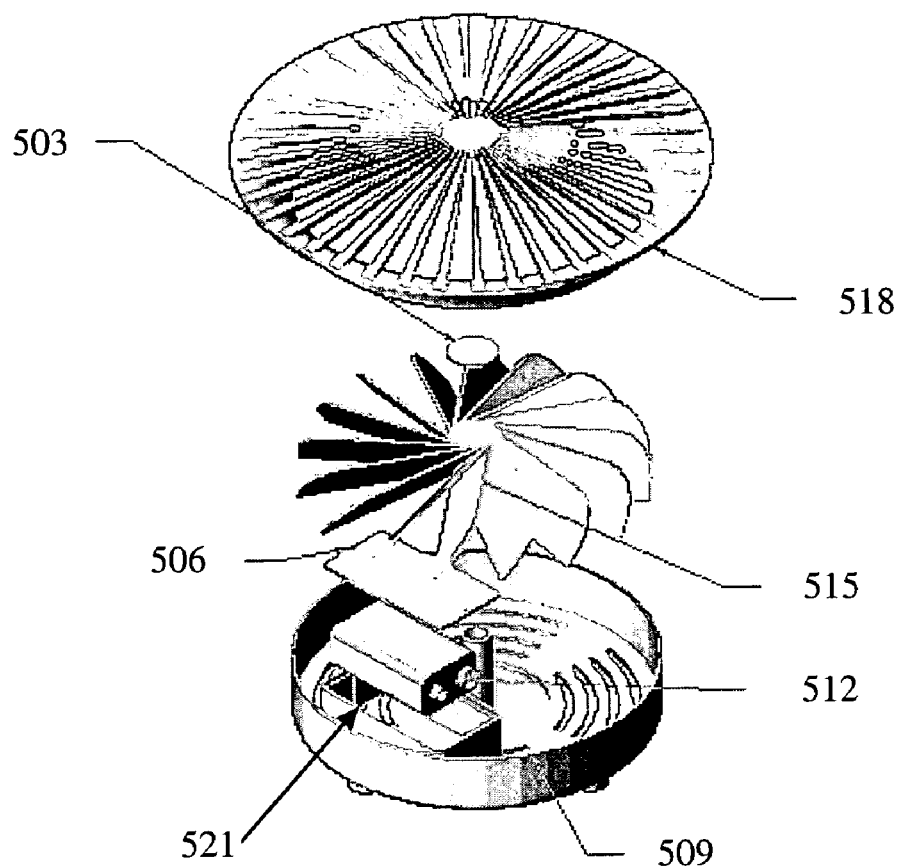
FIG. 5 is an exploded view of a portable protection device according to this invention.

FIG. 5 is an exploded view of a portable personal protection device 500. The device 500 comprises a housing 509 containing a battery receptacle 521 with lid 506 for containing a 9-volt battery 512. The battery 512 powers a fan 515 for dispersing the insect repellent contained in the cartridge 503 located downwind of the fan 515. The insect repellent is dispersed from the cartridge 503 and out the top grill 518.

Figure 6A:
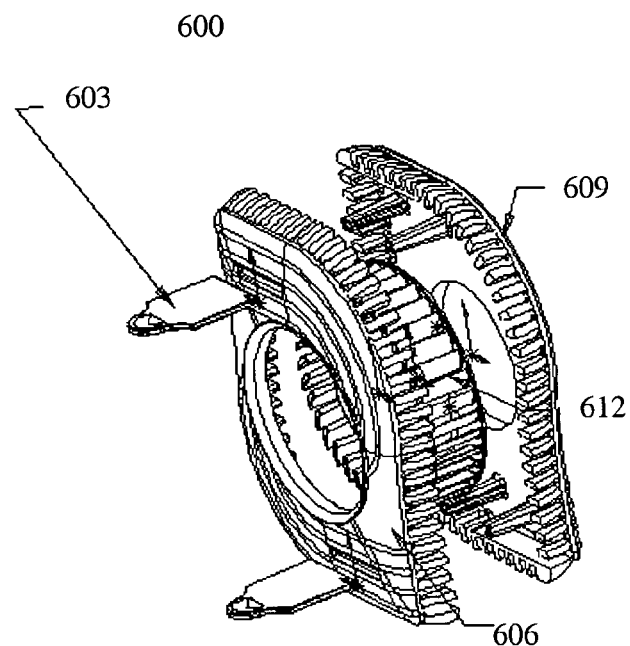
FIG. 6A is an exploded view of an assembly comprising a fan and cartridge for use in a device according this invention.
Figure 6B:
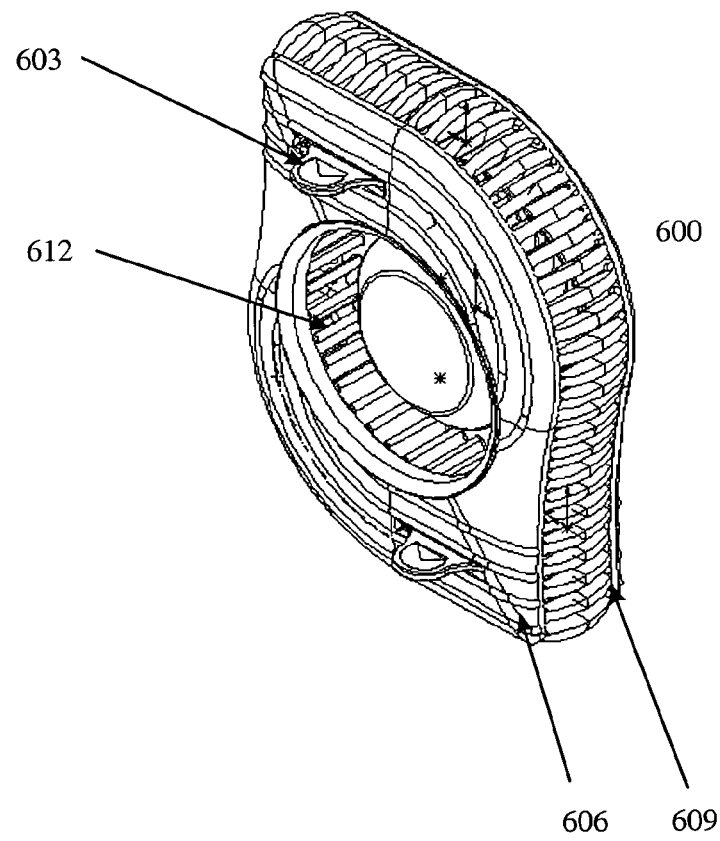
FIG. 6B is the fan and cartridge assembly.

FIG. 6A is an exploded view of an assembly 600 comprising a centrifugal fan 612 and cartridges 603 for use in a device according this invention. The assembly 600 has a housing 609 that holds the cartridges 603 downwind of the fan 612. The housing 609 has an air intake 606 for supplying air to the fan 612. FIG. 6B is the finished assembly 600.

Figure 7:
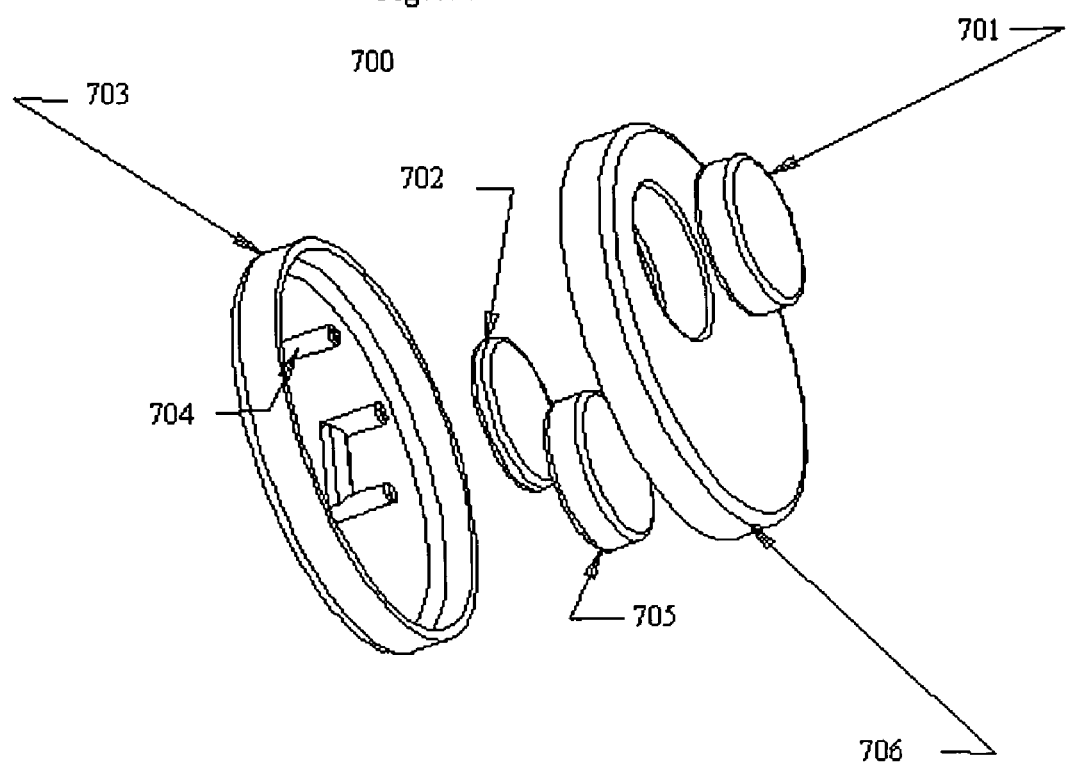
FIG. 7 is an exploded view of a personal protection device for repelling insects that employs an atomizer for dispersing the insect repellent.

FIG. 7 is a personal protection device 700 employing an atomizer to disperse insect repellent. The device 700 comprises a replaceable cartridge 701 that fits in a reservoir in the back cover of a housing 706. A pump 705 pumps the composition contained within the cartridge 701 to a nozzle 704 attached to the front cover of the housing 703. A battery 702 powers the pump 705. The personal protection device 700 is suitable to be worn as a pendant by a subject (not shown).

Figure 8:
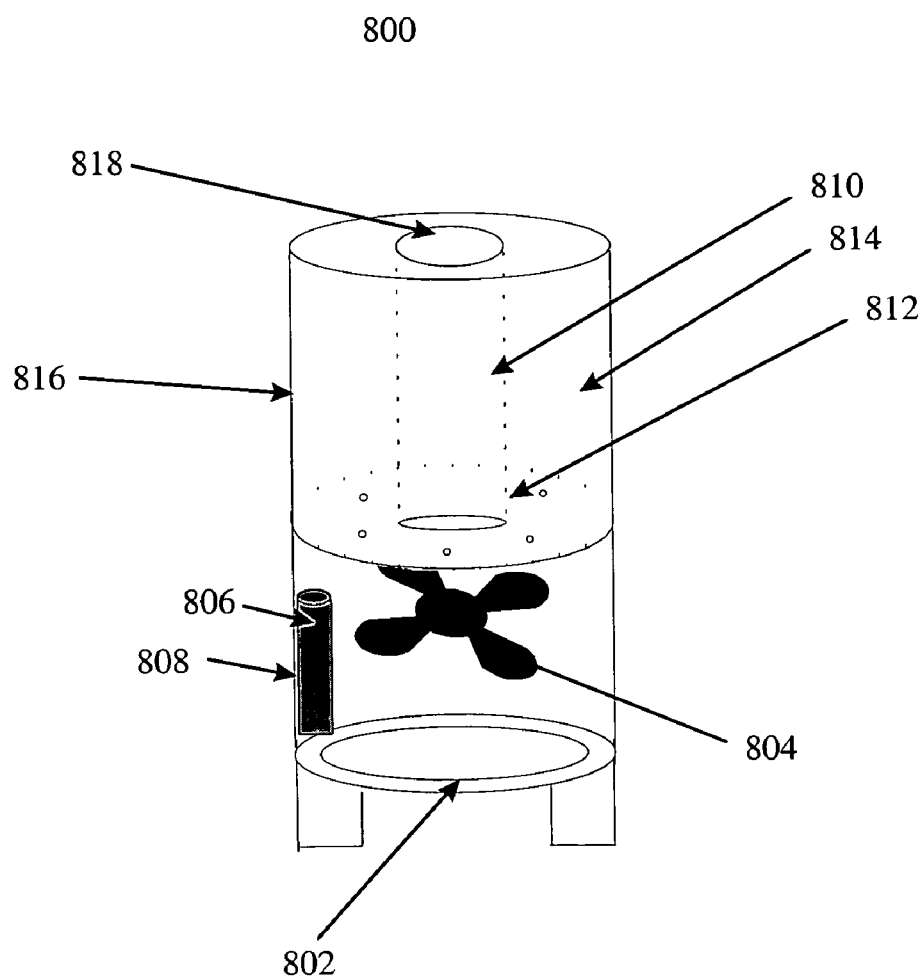
FIG. 8 is a personal protection device for repelling insects that employs chemical heat and a separate power source for the dispersion means for dispersing the insect repellent.

FIG. 8 is a personal protection device 800 according to this invention. The device 800 comprises a stand 802 having a fan 804 mounted thereon. The fan is driven by a motor powered by a battery 806 in a battery receptacle 808. The fan 804 creates air currents that blow upward past a cartridge 810 according to this invention. The cartridge 810 is surrounded by a metal mesh 812. The metal mesh 812 is heated by chemical heating means 814 such as THERMACARE® adjacent to the metal mesh 812. The chemical heating means 814 are surrounded by a housing 816 having an air outlet 818. The air currents carry the composition from the cartridge 810 out of the device 800 through the air outlet 818. This device 800 is particularly well suited to be placed on the floor, ground, or table near one subject or more than one subjects who are in close proximity to each other.

Figure 9:
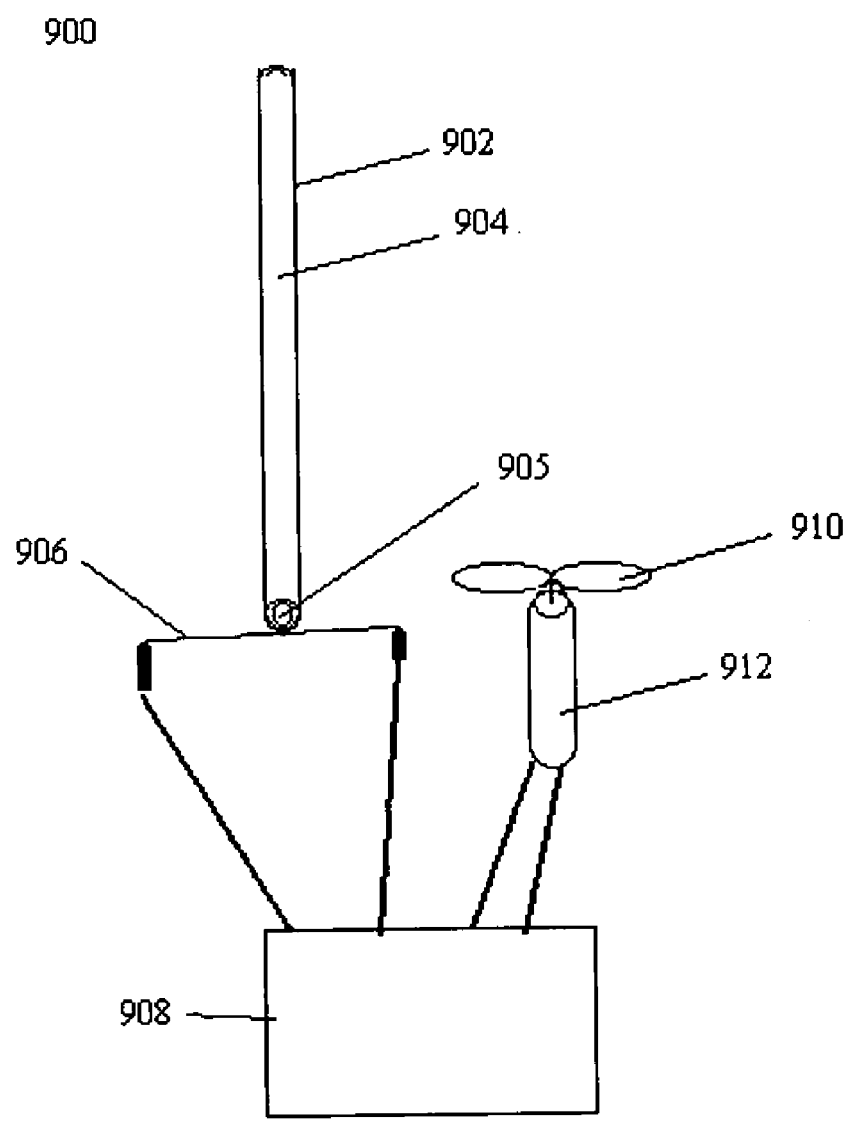
FIG. 9 is a personal protection device for repelling insects that employs point heating means for dispersing the insect repellent.

FIG. 9 is schematic of a personal protection device 900 employing point heating to disperse a composition comprising an insect repellent 904. The device 900 comprises a capillary tube 902 that contains the composition 904. A filament wire 906 is located at or near the outlet 905 of the capillary tube 902 such that the capillary tube 902 supplies the composition 904 to the filament wire 906. The filament wire 906 is heated by a power supply 908 and vaporizes the composition 904. A fan 910 turned by a motor 912 powered by the power supply 908 disperses the vaporized composition 904.

Figure 10:
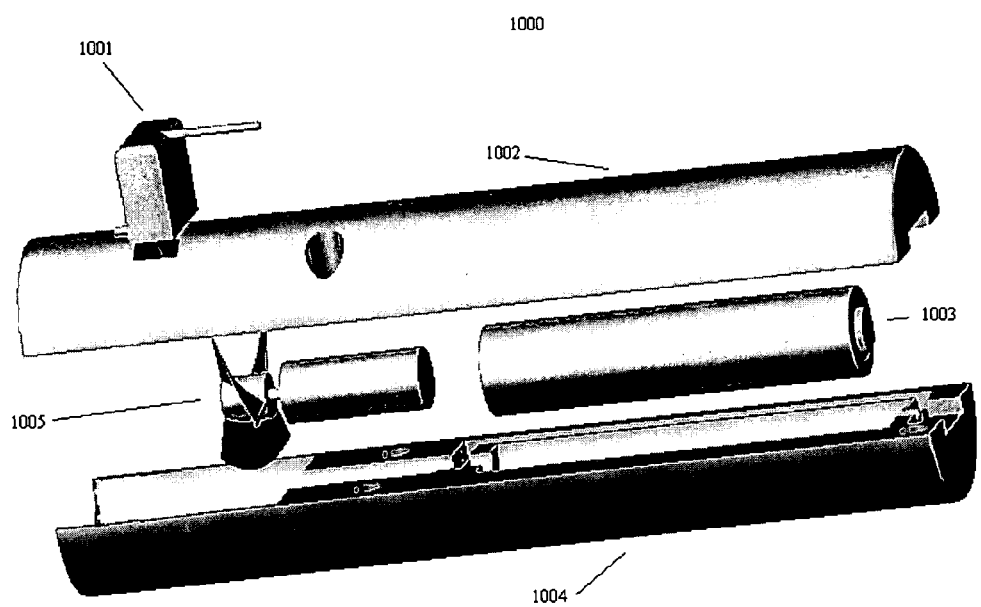
FIG. 10 is a personal protection device for repelling insects.

FIG. 10 is a personal protection device 1000 according to an alternative embodiment of this invention. The device 1000 has a cartridge 1001 comprising a heating element and a composition comprising an insect repellent. The cartridge 1001 fits into a top housing 1002. The top housing 1002 connects to a bottom housing 1004. The top housing 1002 and bottom housing 1004 contain a battery 1003 which powers a motor and fan assembly 1005.

Methods of Use of the Devices

This invention further relates to methods for protecting subjects from insect bites and insect landings. In one embodiment of the invention, the method comprises: activating a personal protection device in the vicinity of a subject (or more than one subjects who are in close proximity to each other) needing protection from insect bites and insect landings.

In an alternative embodiment of the invention, the method comprises: attaching, to a subject needing protection from insect bites and insect landings, a wearable device according to this invention, and activating the device.

The subject may be a human or other mammal such as a pet (e.g., dog or cat). The subject may also be livestock such as cattle, horses, pigs, or sheep, or wild animals such as deer.

EXAMPLES

These examples are intended to illustrate the invention to those skilled in the art and should not be interpreted as limiting the scope of the invention set forth in the claims.

Reference Example 1

Caged Mosquito Repellency Test Method

Mosquito repellency is tested with *Aedes aegypti* mosquitoes. Mosquitoes, aged four to twenty days, are kept in SYSCO® 355 ml disposable paper food containers (available from Sysco Corporation of Houston, Tex.), each with a wedding veil covering. On the veil are placed two cotton balls, one soaked in water and one in 0.3 M sucrose to feed the mosquitoes. The cotton balls are removed two to 24 hours prior to repellency testing.

The covered containers are placed in a wooden frame cage with dimensions seven by five by three feet that is lined on the top and sides with wedding veil to allow air flow. A human subject enters the cage through a door frame in one of the sides. Once inside, the subject releases about twenty mosquitoes from a container, and a timer is started for the control period to allow the mosquitoes to be attracted to the subject. After thirty seconds, the number of mosquitoes that landed on the subject is counted, with the number determined by both the subject and an observer outside the cage. After sixty seconds, the subject counts the number of mosquitoes on the walls and ceiling. Each of these counts is repeated at intervals until about eight minutes elapse. In each experiment, most of the mosquitoes land on the subject during the control period. The mosquitoes are typically not allowed to suck blood during the control or test periods.

After the control period, the effect of a test repellent sample is monitored over about the next eight minutes, with the number of mosquito landings on the subject and wall measured as in the control period.

Example 1

Device Using Bulk Heating and Blowing Means to Disperse Insect Repellent

A mosquito-repellent device is constructed using a first aluminum plate heated by electrical resistance. A second aluminum plate smaller than the first is placed on the first plate, so that the two plates are in thermal contact. A thermocouple is placed onto the smaller plate so that its temperature can be monitored and controlled at 45° C. Adjacent to the smaller plate is a fan (3.5 cubic feet per minute) which blows air over the smaller plate. Twenty milligrams of bioallethrin is placed on the smaller aluminum plate so that the bioallethrin is heated and its vapors blown by the fan. The device is tested according to the method of Reference Example 1.

Mosquitoes are repelled by bioallethrin as indicated by a reduction in the number of mosquitoes landing on the human subject within one to three minutes after activating the device. The numbers of mosquitoes landing on the subject in each time interval after activation of the device are below in Table E1.

Comparative Example 1

Control Using No Insect Repellent

As the control for Example 1, a fan is used to blow air over a 45° C. first aluminum plate. This control device is the same device in Example 1 except that the bioallethrin and second aluminum plate are omitted, and the thermocouple is used to monitor the temperature of the first plate. Under these conditions, the heat and fan do not repel mosquitoes. The numbers of mosquitoes landing on the subject in each time interval are below in Table E1. The device is tested according to the method of Reference Example 1.

TABLE E1

| Time Time (sec) | Comparative Example 1 No Bioallethrin | Example 1 Bioallethrin | Relative Repellency Factor |
|---|---|---|---|
| 30 | 4 | 11 | 0.4 |
| 90 | 11 | 3 | 4 |
| 150 | 12 | 0 | >20 |
| 210 | 16 | 1 | 16 |
| 270 | 17 | 1 | 17 |
| 330 | 15 | 1 | 15 |
| 390 | 17 | 1 | 17 |
| 450 | 16 | 1 | 16 |

Example 1 and Comparative Example 1 show that a device according to this invention dramatically reduces the number of mosquitoes that land on a subject within 90 seconds after activating the device. Although the relative repellency factor in the first thirty second interval is lower than that in subsequent intervals, this may be due to the method used for carrying out Example 1 and Comparative Example 1. Comparative Example 1 is carried out as the control prior to Example 1. The mosquitoes may not have located the test subject in this initial 30 second interval. Example 1 is carried out immediately after Comparative Example 1; the subject does not leave the cage after Comparative Example 1. Therefore, the mosquitoes will have been acclimated to the subject's presence in the cage during this time interval.

Comparative Example 2

Commercially Available Device Employing Heating Means to Disperse Insect Repellent A commercial mosquito repellent product, THERMACELL® made by the Schawbel Corporation of Boston, Mass. is tested according to the method of Reference Example 1, except that testing continues beyond 8 minutes after activation of the product. This product is a portable device that employs butane combustion to heat allethrin so that it will vaporize. The THERMACELL® is activated at the beginning of the test period and placed on a stool next to the human subject, with the device's vapor-emitting surface facing up. The number of mosquitoes that land on the subject during each time interval is shown below in Table E2. Mosquitoes are repelled after a lag of about eight minutes, a result similar to the product's labeling, which indicates a lag of ten to thirty minutes before the product will effectively repel mosquitoes.

TABLE E2

| | Comparative Example 2 | | |
|---|---|---|---|
| Time Time (sec) | No Allethrin (Before activating) | Allethrin (After activating) | Relative Repellency Factor |
| 30 | 11 | 16 | 0.7 |
| 90 | 13 | 11 | 1 |
| 150 | 14 | 15 | 0.9 |
| 210 | 14 | 10 | 1 |
| 270 | 12 | 12 | 1 |
| 330 | 12 | 8 | 2 |
| 450 | 12 | 8 | 2 |
| 540 | — | 3 | |
| 650 | — | 5 | |

Comparative Example 2 shows that a commercially available spatial repellent device has a long lag time to begin repelling mosquitoes after a device is activated.

Comparative Example 3

Commercially Available Device Employing Passive Evaporation to Disperse Insect Repellent A commercial mosquito repellent product, BUGOFF™ available from the Stinger Division of Kaz, Inc., is tested by the method of Reference Example 1. The product is a passive evaporation device employing a combination of essential oils (citronella, geraniol, and lemongrass) as a chemical repellent in the form of a wrist band. The product is used as indicated on the label. There is no detectable repellency under these conditions. Results of the test are reported below in Table E3.

TABLE E3

| | Comparative Example 3 | | |
|---|---|---|---|
| Time (sec) | Without Device | With Device | Relative Repellency Factor |
| 30 | 8 | 14 | 0.6 |
| 90 | 11 | 10 | 1 |
| 150 | 14 | 16 | 1 |
| 210 | 13 | 14 | 1 |
| 270 | 14 | 14 | 1 |
| 330 | 14 | 14 | 1 |
| 390 | 16 | 16 | 1 |
| 450 | 17 | 15 | 1 |

Comparative Example 4

Commercially Available Device Employing Passive Evaporation to Disperse Insect Repellent A commercial mosquito repellent product, Bug Chaser™ available from Island Marketing, Corp., is tested by the method of Reference Example 1. The product is a passive evaporation device employing a chemical repellent (D-limonene, dihydro-5-pentyl-2-(3H)-furanone, and dihydro-5-heptyl-2-(3H)-furanone) in the form of a wrist band. The product is used as indicated on the label. There is no detectable repellency under these conditions. Results of the test are reported below in Table E4.

TABLE E4

| Time | Comparative Example 4 | | |
|---|---|---|---|
| Time (sec) | Without Device | With Device | Relative Repellency Factor |
| 30 | 11 | 9 | 1 |
| 90 | 9 | 14 | 0.6 |
| 150 | 13 | 13 | 1 |
| 210 | 14 | 12 | 1 |
| 270 | 11 | 8 | 1 |
| 330 | 14 | 12 | 1 |
| 390 | 12 | 13 | 1 |
| 450 | 14 | 12 | 1 |

Comparative Example 5

Commercially Available Device Employing Passive Evaporation to Disperse Insect Repellent A commercial mosquito repellent product, Buzz Away Stick Its™ available from Quantum, Inc., of Eugene, Oreg., is tested by the method of Reference Example 1. The product is a passive evaporation device employing a chemical repellent (citronella oil) in the form of an adhesive patch. The product is used as indicated on the label. There is no detectable repellency under these conditions.

Comparative Examples 3, 4, and 5 show that passive evaporation-type devices are relatively ineffective at repelling mosquitoes in this test protocol.

Comparative Example 6

Commercially Available Device

A commercial product advertised for mosquito repellency, the Contra, is tested by the method of Reference Example 1. This product is a sound-generating clip on device. This device has two frequency settings, one to mimic dragonfly wing noise and the other to mimic a bat's sonar. Repellency is tested with this device at each setting. About fifteen mosquitoes are observed on the subject at each time point during the eight minute tests at each setting, indicating that there is no repellency by either setting under these conditions.

Comparative Examples 3–6 show that wearable devices currently on the market are relatively ineffective at repelling mosquitoes in this test protocol.

Example 2

Device Using Bulk Heating and Blowing Means to Disperse Insect Repellent

The mosquito-repellent device of Example 1 is tested according to the method of Reference Example 1, except that 30 milligrams of empenthrin is used as the insect repellent instead of bioallethrin, and the temperature to which the empenthrin is heated is 30° C.

Mosquitoes are repelled by empenthrin as indicated by a reduction in the number of mosquitoes landing on the human subject within one to three minutes after activating the device. The numbers of mosquitoes landing on the subject in each 30 second interval after activation of the device are below in Table E5.

Comparative Example 7

Control For Example 2 Using No Insect Repellent

As the control for Example 2, a fan is used to blow air over a 30° C. first aluminum plate. This control device is the same device in Example 1 except that the bioallethrin and second aluminum plate are omitted, and the thermocouple is used to monitor the temperature of the first plate. Under these conditions, the heat and fan do not repel mosquitoes. The numbers of mosquitoes landing on the subject in each 30 second interval are below in Table 5. The device is tested according to the method of Reference Example 1.

TABLE E5

| Time Time (sec) | Comparative Example 7 No Empenthrin | Example 2 Empenthrin | Relative Repellency Factor |
|---|---|---|---|
| 30 | 6 | 15 | 0.4 |
| 90 | 7 | 15 | 0.5 |
| 150 | 10 | 2 | 5 |
| 210 | 14 | 0 | >20 |
| 270 | not tested | 0 | not applicable |
| 330 | not tested | 0 | not applicable |
| 390 | not tested | 1 | not applicable |
| 450 | not tested | 1 | not applicable |

Example 2 and Comparative Example 7 show that insect repellents other than allethrin (e.g., empenthrin) can be used in this invention. Example 2 and Comparative Example 7 show that the devices of this invention are effective even at temperatures as low as 30° C.

Reference Example 2

Outdoor Mosquito Repellency Test Method

To measure the mosquito landing intensity under particular outside conditions, a human subject stood still for five minutes. At each 30 second interval, the subject counted mosquitoes that had landed on his or her body, without concern as to whether a single mosquito was counted at more than one time. Following the test interval, the subject would walk to the next testing location. The subject would return to these control testing locations with an activated device and count mosquito landings in the same manner. In all cases, the results reported are the sum of mosquito landings in two different tests at two different locations.

Example 3

Wearable Device Employing Bulk Heating Means and Blowing Means to Disperse the Insect Repellent A wearable device employing heat and a fan to disperse allethrin is tested by the method of Reference Example 2. The device is held near a human subject's belt with the air flow directed downward. The results are in Table E6.

Comparative Example 8

No Device Control for Example 3

The method of Reference Example 2 was carried out on a subject with no device as a control for Example 3. The results are in Table E6.

Comparative Example 9

Commercially Available Device Employing a Fan to Disperse the Insect Repellent A commercially available mosquito repellent device, OSOTO de NO MAT from Earth Seiyaku, Inc., is tested by the method of Reference Example 2. The device is wearable and employs a fan to disperse transfluthrin. A pad impregnated with transfluthrin is placed at the air intake of the fan. No heat is provided. The results are in Table E6.

Comparative Example 10

No Device Control for Comparative Example 9

As a control for Comparative Example 9, no device was used by a subject under the conditions of Reference Example 2. The results are in Table E6.

TABLE E6

| Time (sec) | Ex. 3 | Comparative Example 8 | Rel. Repel. Factor Ex. 3 and C. Ex. 8 | Comparative Example 9 | Comparative Example 10 | Rel. Repel. Factor C. Ex. 9 and C. Ex. 10 |
|---|---|---|---|---|---|---|
| 0 | 0 | 4 | >20 | 2 | 3 | 2 |
| 30 | 1 | 11 | 11 | 6 | 7 | 1 |
| 60 | 0 | 7 | >20 | 9 | 10 | 1 |
| 90 | 0 | 12 | >20 | 9 | 5 | 1 |
| 120 | 0 | 14 | >20 | 9 | 9 | 1 |
| 150 | 0 | 12 | >20 | 9 | 6 | 1 |
| 180 | 0 | 13 | >20 | 6 | 6 | 1 |
| 210 | 1 | 6 | 6 | 4 | 7 | 2 |
| 240 | 0 | 7 | >20 | 7 | 10 | 1 |
| 270 | 0 | 6 | >20 | 2 | 7 | 4 |
| 300 | 0 | 7 | >20 | 1 | 7 | 7 |

Example 3 and Comparative Examples 8–10 show that overall the number of mosquito landings on a subject per unit time is dramatically reduced using the wearable device with both heat and a fan as compared to the commercially available device (with a fan but no heat) or no device in this test protocol.

Reference Example 3

Outdoor Mosquito Repellency Test Method

To measure the mosquito landing intensity under particular outside conditions, a human subject stood still for five minutes. At each 30 second interval, the subject counted mosquitoes that had landed on his or her body, without concern as to whether a single mosquito was counted at more than one time. Following the test interval, the subject would walk to the next testing location. The subject would return to these control testing locations with an activated device and count mosquito landings in the same manner. In all cases, the results reported are the sum of mosquito landings in three different tests at three different locations.

Comparative Example 11

Commercially Available Device Employing Heating Means to Disperse Insect Repellent A commercial mosquito repellent product, THERMACELL® made by the Schawbel Corporation of Boston, Mass. is tested according to the method of Reference Example 3. The number of mosquitoes that land on the subject during each time interval is shown below in Table E7.

Comparative Example 12

No Device Control for Comparative Example 11

As a control for Comparative Example 11, the method of Reference Example 3 is carried out on a subject using no device. The results are in Table E7.

Example 4

Device Employing Bulk Heating Means and Blowing Means to Disperse the Insect Repellent A fan is placed on the product used in Comparative Example 11. The modified product is tested according to the method of Reference Example 3. The number of mosquitoes that land on the subject during each time interval is shown below in Table E7.

Comparative Example 13

No Device Control for Example 4

As a control for Example 4, the method of Reference Example 3 is carried out on a subject using no device. The results are in Table E7.

TABLE E7

| Time (sec) | Ex. 4 | Comparative Example 13 | Rel. Repel. Factor Ex. 4 & C. Ex. 13 | Comparative Example 11 | Comparative Example 12 | Rel. Repel. Factor C. Ex. 11 & C. Ex. 12 |
|---|---|---|---|---|---|---|
| 0 | 17 | 25 | 1 | 31 | 23 | 1 |
| 30 | 7 | 34 | 5 | 45 | 42 | 1 |
| 60 | 7 | 28 | 4 | 42 | 48 | 1 |
| 90 | 6 | 39 | 7 | 40 | 53 | 1 |
| 120 | 0 | 37 | — | 44 | 51 | 1 |
| 150 | 0 | 31 | — | 38 | 45 | 1 |
| 180 | 1 | 32 | 32 | 28 | 42 | 2 |
| 210 | 1 | 28 | 28 | 38 | 55 | 1 |
| 240 | 0 | 29 | — | 26 | 41 | 2 |
| 270 | 1 | 34 | 34 | 28 | 40 | 1 |
| 300 | 0 | 30 | — | 24 | 40 | 2 |

Example 4 and Comparative Examples 11–13 show that the number of mosquitoes landing on a subject per unit time is dramatically reduced when a portable device employing both heat and a fan is used to disperse the repellent as compared to when a commercially available device employing only heat to disperse the repellent is used in this test protocol.

Example 5

Device Employing Point Heating Means and Blowing Means to Disperse the Insect Repellent A device according to this invention is tested according to the method of Reference Example 1. The device has point heating means comprising a NICHROME® wire filament and a fan. The point heating means and fan are powered by one AAA battery. A capillary glass tube delivers allethrin onto the filament. The results are in Table E8.

Comparative Example 14

No Device Control for Example 5

The test method of Reference Example 1 is carried out on a subject with no personal protection device. The results are in Table E8.

TABLE E8

| Time Time (sec) | Comparative Example 14 No Device | Example 5 Point Heating Device | Relative Repellency Factor |
|---|---|---|---|
| 30 | 6 | 6 | 1 |
| 90 | 7 | 2 | 3 |
| 150 | 11 | 1 | 11 |
| 210 | 12 | 1 | 12 |
| 300 | — | 0 | — |
| 420 | — | 1 | — |
| 480 | — | 0 | — |

Example 5 and Comparative Example 14 show that a device employing point heating means is effective for repelling mosquitoes.

What is claimed is:

1. A device for repelling insects comprising: (1) a cartridge comprising (a) a composition comprising an insect repellent, (2) dispersion means for actively dispersing the composition, wherein the cartridge is mounted to the device with respect to said dispersion means such that said dispersion means cause the composition to be removed from the cartridge and to be dispersed in an area around a subject, and (3) attachment means capable of attaching the device to the subject, wherein said attachment means are mounted to the device such that said attachment means do not interfere with said dispersion means.

2. The device of claim 1, wherein the device begins providing protection within about 1 minute after activating the device.

3. The device of claim 1, wherein the dispersion means further comprises blowing means and point heating means.

4. The device of claim 1, wherein the device begins providing protection within about 3 minutes after activating the device.

5. A device for repelling insects comprising: (1) a cartridge comprising (a) a composition comprising an insect repellent, and (2) dispersion means for actively dispersing the composition, wherein the cartridge is mounted to the device with respect to said dispersion means such that said dispersion means cause the composition to be removed from the cartridge and to be dispersed in an area around a subject, and wherein the device provides a relative repellency factor of about 15 or greater and the device further comprises: (3) attachment means capable of attaching the wearable personal protection device to the subject, wherein said attachment means are mounted to the device such that said attachment means do not interfere with said dispersion means.

6. A wearable personal protection device for repelling insects comprising: (1) a cartridge comprising (a) a composition comprising an insect repellent, and (2) dispersion means for actively dispersing the composition, wherein the cartridge is mounted to the wearable personal protection device with respect to said dispersion means such that said dispersion means cause the composition to be removed from the cartridge and to be dispersed in an area around a subject, and wherein said dispersion means includes point heating means and blowing means for volatilizing the composition and dispersing the composition into the area around the subject; and (3) attachment means capable of attaching the wearable personal protection device to the subject, wherein said attachment means are mounted to the device such that said attachment means do not interfere with said dispersion means.

7. The device of claim 6, wherein (a) the composition is contained in the cartridge.

8. The device of claim 7, wherein the cartridge is removable.

9. The device of claim 8, wherein the cartridge is replaceable.

10. The device of claim 7, wherein the cartridge is not removable and the device is disposable.

11. The device of claim 7, wherein the cartridge has a shape selected from the group consisting of a flat shape and a three-dimensional shape.

12. The device of claim 6, wherein (a) the composition further comprises an ingredient selected from the group consisting of a blowing agent, a solvent, a stabilizer, a synergist, a dye, a perfume, and combinations thereof.

13. The device of claim 6, wherein said attachment means comprise one or more elements selected from the group consisting of clips, pins, adhesives, hook and loop fasteners, magnets, ties, necklaces, straps, bands, and buckles.

14. The device of claim 6, wherein said dispersion means further comprise an electrical power source for powering said point heating means.

15. A wearable personal protection device for repelling insects comprising: (1) a cartridge comprising (a) a composition comprising an insect repellent, and (2) dispersion means for actively dispersing the composition, wherein the cartridge is mounted to the personal protection device with respect to said dispersion means such that said dispersion means cause the composition to be removed from the cartridge and to be dispersed in an area around a subject, and wherein said dispersion means comprises point heating means and blowing means for blowing volatilized composition into the area around the subject, a first power source for powering the point heating means, and a second power source for powering said blowing means; and (3) attachment means.

16. The device of claim 15, wherein the cartridge is removable.

17. The device of claim 16, wherein the cartridge is replaceable.

18. The device of claim 16, wherein the cartridge is not removable and the device is disposable.

19. The device of claim 16, wherein (a) the composition further comprises an ingredient selected from the group consisting of a blowing agent, a stabilizer, a synergist, a dye, a perfume, and combinations thereof.

20. A personal protection device comprising: (i) a cartridge containing a composition comprising a liquid droplet carrying an insect repellent, (ii) a filament located at or near an outlet of a capillary tube portion of the cartridge such that the composition contacts the filament, (iii) a power supply communicating with the filament and a motor such that the power supply heats the filament and powers the motor, and (iv) a fan connected to the motor.

21. A personal protection device comprising: (i) a cartridge containing a composition comprising an insect repellent, (ii) a filament located at or near an outlet of the cartridge such that the composition contacts the filament, (iii) a power supply communicating with the filament and a motor such that the power supply heats the filament and powers the motor, and (iv) a fan connected to the motor wherein the cartridge is a capillary tube and the composition is a liquid.

22. The device of claim 21, wherein the filament is part of the cartridge.

23. A personal protection device comprising: (i) a cartridge containing a composition comprising an insect repellent, (ii) a filament located at or near an outlet of the cartridge such that the composition contacts the filament, (iii) a power supply communicating with the filament and a motor such that the power supply heats the filament and powers the motor, and (iv) a fan connected to the motor wherein the composition is a solid and the filament is part of the cartridge.

24. A method for protecting a subject from insects comprising: attaching to the subject a wearable personal protection device comprising (1) a cartridge comprising (a) a composition comprising an insect repellent, and (2) dispersion means for actively dispersing the composition, wherein the cartridge is mounted to the wearable personal protection device with respect to said dispersion means such that said dispersion means cause the composition to be removed from the cartridge and to be dispersed in an area around a subject, and wherein said dispersion means includes point heating means for volatilizing the composition and dispersing the composition into the area around the subject and further includes blowing means for blowing volatilized composition; and (3) attachment means capable of attaching the wearable personal protection device to the subject, wherein said attachment means are mounted to the device such that said attachment means do not interfere with said dispersion means; and activating the wearable personal protection device.

25. The method of claim 24, wherein the insects are flying insects selected from the group consisting of mosquitoes, house flies, biting midges, gnats, black flies, sand flies, horse flies, and tsetse flies.

26. The method of claim 24, wherein the insects are crawling insects selected from the group consisting of fleas, ticks, mites, chiggers, and spiders.

27. The method of claim 24, wherein the insect repellent is selected from the group consisting of N,N-diethyl-m-toluamide, pyrethrins, and pyrethroids.

28. The method of claim 27, wherein the insect repellent is a pyrethroid and the effective amount of the insect repellent is from less than about 1 up to about 50 parts per billion in air.

29. The method of claim 27, wherein the pyrethroid is selected from the group consisting of allethrin, d-trans allethrin, d-allethrin, bioallethrin, esdepallethrin, empenthrin, prallethrin, transfluthrin, and combinations thereof.

30. The method of claim 29, wherein the insect repellent is selected from the group consisting of allethrin and prallethrin.

31. The method of claim 24, wherein the subject is a human.

32. The method of claim 24, wherein the subject is selected from the group consisting of pets, livestock, and wild animals.

33. A method for protecting a subject from insects comprising: attaching a wearable personal protection device to the subject and activating the device, wherein the personal protection device comprises (1) a cartridge comprising (a) a composition comprising an insect repellent, and (2) dispersion means for actively dispersing the composition, wherein the cartridge is mounted to the personal protection device with respect to said dispersion means such that said dispersion means cause the composition to be removed from the cartridge and to be dispersed in an area around a subject, and wherein said dispersion means includes heating means for volatilizing the composition and blowing means for blowing volatilized composition into the area around the subject, wherein said dispersion means comprise a first power source for powering said heating means and a second power source for powering said blowing means.

34. The method of claim 33, wherein said heating means comprises point heating means.

35. The method of claim 33, wherein the subject is a human.

36. The method of claim 33, wherein the subject is selected from the group consisting of pets, livestock, and wild animals.

* * * * *